US012566577B2

(12) United States Patent
Wu et al.

(10) Patent No.: US 12,566,577 B2
(45) Date of Patent: Mar. 3, 2026

(54) DATA ACCESS METHOD AND STORAGE SUBSYSTEM THEREFOR

(71) Applicant: Infortrend Technology, Inc., New Taipei (TW)

(72) Inventors: Yen-Chen Wu, New Taipei (TW); Ying-Wen Lin, New Taipei (TW); Chih-Min Hsiao, New Taipei (TW); Chun-Hsiang Lin, New Taipei (TW)

(73) Assignee: Infortrend Technology, Inc., New Taipei City (TW)

( * ) Notice: Subject to any disclaimer, the term of this patent is extended or adjusted under 35 U.S.C. 154(b) by 0 days.

(21) Appl. No.: 18/954,560

(22) Filed: Nov. 21, 2024

(65) Prior Publication Data

US 2026/0016996 A1     Jan. 15, 2026

Related U.S. Application Data

(63) Continuation-in-part of application No. 18/516,966, filed on Nov. 22, 2023, now Pat. No. 12,265,739.

(60) Provisional application No. 63/447,869, filed on Feb. 23, 2023.

(51) Int. Cl.
*G06F 3/00* (2006.01)
*G06F 3/06* (2006.01)

(52) U.S. Cl.
CPC .......... *G06F 3/0664* (2013.01); *G06F 3/0604* (2013.01); *G06F 3/0689* (2013.01)

(58) Field of Classification Search
CPC ..... G06F 3/0664; G06F 3/0604; G06F 3/0689
See application file for complete search history.

(56) References Cited

U.S. PATENT DOCUMENTS

| | | | |
|---|---|---|---|
| 7,089,345 B1 * | 8/2006 | Lynn ..................... | G06F 3/0635 |
| | | | 710/316 |
| 2005/0005062 A1 * | 1/2005 | Liu ........................ | G06F 3/0683 |
| | | | 711/112 |
| 2018/0232142 A1 * | 8/2018 | Shekar ................ | G06F 11/2046 |
| 2023/0195378 A1 * | 6/2023 | Zhang ....................... | G06F 1/30 |
| | | | 711/154 |

* cited by examiner

*Primary Examiner* — Craig S Goldschmidt
(74) *Attorney, Agent, or Firm* — Winston Hsu

(57) ABSTRACT

The present invention discloses a data access method and a storage subsystem implementing the method. The storage subsystem includes two storage virtualization controllers (SVC 1, SVC 2), a backplane, a physical storage device (PSD), and a clock generation circuit. The clock generation circuit is mounted on the backplane and provides a dedicated clock signal to the PSD. The PSD has a single port, and the lanes of the single port are divided into two half portions, each of which is coupled to one of the two storage virtualization controllers (SVC 1, SVC 2). Therefore, the present invention eliminates the need for additional intermediate components to couple the single-port PSD to the two storage virtualization controllers (SVC 1, SVC 2). This leads to simplified wiring and reduced costs, and the PSD will not be affected by failures of the intermediate components, thereby enhancing the redundancy architecture of the storage subsystem.

41 Claims, 12 Drawing Sheets

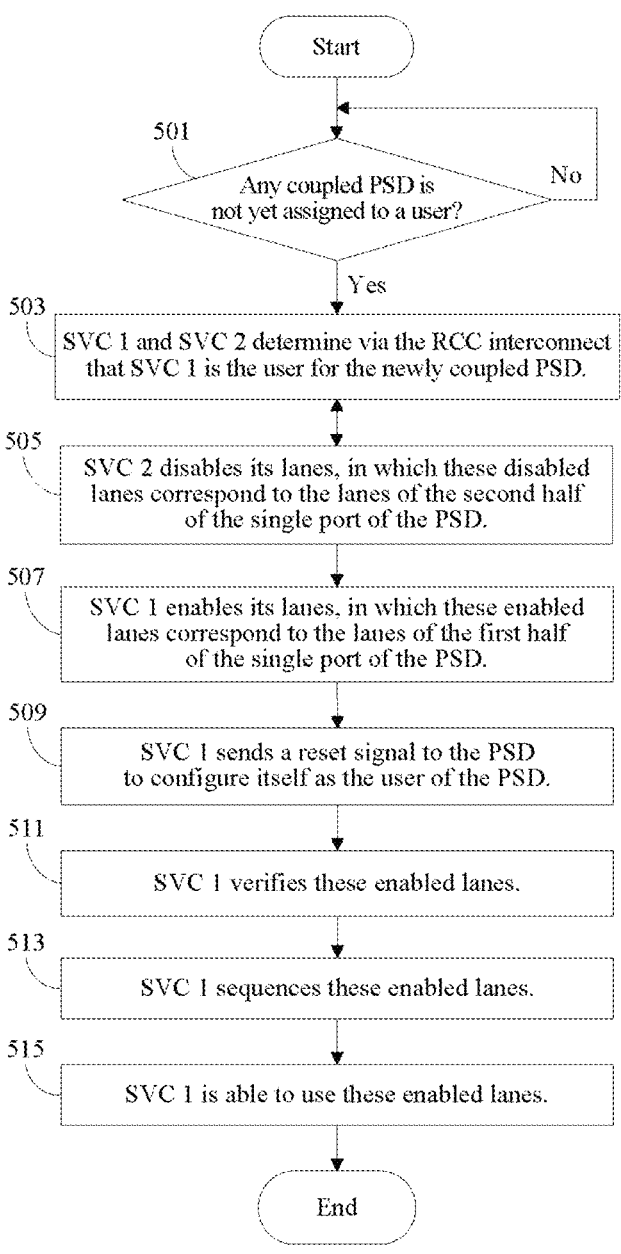

Start

501
Any coupled PSD is
not yet assigned to a user?        No

Yes

503
SVC 1 and SVC 2 determine via the RCC interconnect
that SVC 1 is the user for the newly coupled PSD.

505
SVC 2 disables its lanes, in which these disabled
lanes correspond to the lanes of the second half
of the single port of the PSD.

507
SVC 1 enables its lanes, in which these enabled
lanes correspond to the lanes of the first half
of the single port of the PSD.

509
SVC 1 sends a reset signal to the PSD
to configure itself as the user of the PSD.

511
SVC 1 verifies these enabled lanes.

513
SVC 1 sequences these enabled lanes.

515
SVC 1 is able to use these enabled lanes.

End

FIG. 5

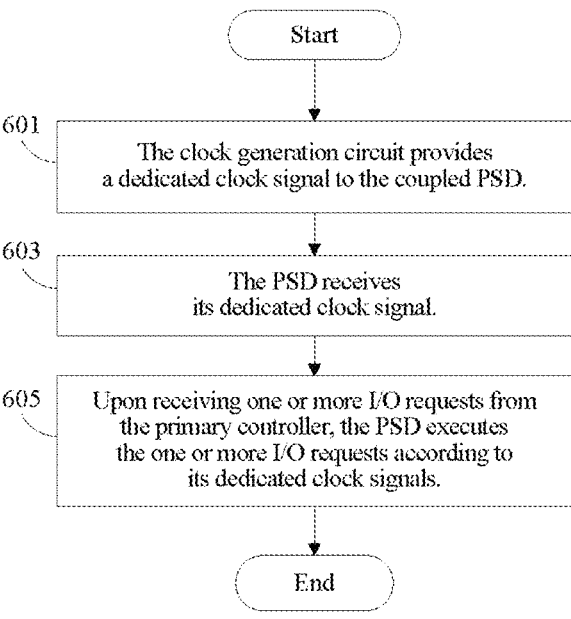

```
                    ┌─────────┐
                    │  Start  │
                    └─────────┘
                         │
                         ▼
601 ┌──────────────────────────────────────────┐
    │      The clock generation circuit provides │
    │  a dedicated clock signal to the coupled PSD. │
    └──────────────────────────────────────────┘
                         │
                         ▼
603 ┌──────────────────────────────────────────┐
    │            The PSD receives               │
    │        its dedicated clock signal.        │
    └──────────────────────────────────────────┘
                         │
                         ▼
605 ┌──────────────────────────────────────────┐
    │  Upon receiving one or more I/O requests from │
    │    the primary controller, the PSD executes │
    │    the one or more I/O requests according to │
    │           its dedicated clock signals.     │
    └──────────────────────────────────────────┘
                         │
                         ▼
                    ┌─────────┐
                    │   End   │
                    └─────────┘
```

FIG. 6

DATA ACCESS METHOD AND STORAGE SUBSYSTEM THEREFOR

CROSS REFERENCE TO RELATED APPLICATION

This application is a continuation-in-part of U.S. application Ser. No. 18/516,966, filed on Nov. 22, 2023, which claims the benefit of U.S. Provisional Application No. 63/447,869, filed on Feb. 23, 2023. The contents of these applications are incorporated herein by reference.

BACKGROUND OF THE INVENTION

1. Field of the Invention

The present invention relates to a data access method and a storage subsystem for implementing the method, and more particularly to a data access method that facilitates communication between a single-port physical storage device (PSD) and a plurality of controllers, as well as a storage subsystem for implementing the method.

2. Description of the Related Art

FIG. 1A is a block diagram illustrating a conventional storage system architecture (1A) (hereinafter referred to as "storage system architecture (1A)"). The storage system architecture (1A) comprises a host (15) and a redundant array of independent disks subsystem (3A) (also referred to as "RAID subsystem (3A)"), wherein the RAID subsystem (3A) comprises a controller pair consisting of two controllers (100, 200) and a plurality of solid state disk (SSD) units (301a, 301b).

To enhance the reliability of data storage systems, it's common to employ redundant architecture by configuring two controllers (for example, a first controller (100) and a second controller (200)) as a controller pair (also known as a "redundant pair"). This setup ensures that when one controller (for example, the first controller (100)) fails or becomes inoperative, the other one (for example, the second controller (200)) can take over the responsibilities of the failed controller (such as taking over the data storage devices originally managed by the failed controller), allowing the host to continue accessing all data storage devices seamlessly without interruption. Furthermore, an increasing number of modern data storage systems are adopting solid state disks (SSDs) as their data storage devices. SSDs may offer either single ports or dual ports for connecting to the controllers. However, dual-port SSDs are not only less common but also significantly more expensive. Consequently, in practical applications, the storage industry predominantly favors single-port SSDs. Thus, to balance e system reliability and cost-effectiveness, configuring a data storage system with two controllers and using single-port SSDs as the data storage devices is a common and widely adopted approach.

Taking FIG. 1A as an example, the RAID subsystem (3A) comprises a first SSD (12) within a first SSD unit (301a) and a second SSD (22) within a second SSD unit (301b), both of which are equipped with only a single port. Consequently, each of the two SSD units (301a, 301b) needs a multiplexer (16, 26), an SSD controller (14, 24), and a clock multiplexer (18, 28) to facilitate the connection of the SSDs (12, 22) to the two controllers (100, 200), as well as to assist in switching and processing of data and signals from the controllers (100, 200). The first SSD controller (14) and the second SSD controller (24) are responsible for receiving control signals from the primary controller (e.g., the first controller (100) or the second controller (200)) in order to control the multiplexers (16, 26) and the clock multiplexers (18, 28) to use the data and signals from the primary controller. They are also responsible for informing the primary controller of connections and operating statuses of the SSDs (12, 22). The first multiplexer (multiplexer 1) (16) and the second multiplexer (multiplexer 2) (26) route data and signals along the designated paths based on the control signals from the SSD controllers (14, 24). The first clock multiplexer (clock multiplexer 1) (18) and the second clock multiplexer (clock multiplexer 2) (28) receive control signals from the SSD controllers (14, 24) and accordingly select the clock signals provided by the primary controller. More specifically, the clock signals of the primary controller are provided by its device-side input/output controller (device-side I/O controller), such as the first device-side I/O controller (1007) of the first controller (100), or the second device-side I/O controller (2007) of the second controller (200).

For example, suppose the primary controller is the first controller (100), and the secondary controller is the second controller (200). At system initialization, the primary controller (the first controller (100)) detects notification signals from the first SSD controller (14) of the first SSD unit (301a) and from the second SSD controller (24) of the second SSD unit (301b), so as to inform the primary controller (the first controller (100)) of the connection to the first SSD (12) and the second SSD (22). Subsequently, the primary controller (the first controller 100) issues signals to notify the first SSD controller (14) and the second SSD controller (24), and through the first SSD controller (14) and the second SSD controller (24), controls the first multiplexer (16) and the second multiplexer (26), respectively, in order to establish paths between the primary controller (the first controller (100)) and the first SSD (12) as well as between the primary controller (the first controller (100)) and the second SSD (22). Additionally, the primary controller (the first controller 100) issues signals to notify the first SSD controller (14) and the second SSD controller (24), and through the first SSD controller (14) and the second SSD controller (24), controls the first clock multiplexer (18) and the second clock multiplexer (28) to receive clock signals provided by the primary controller (specifically, by the first device-side I/O controller (1007) of the first controller (100)), enabling the first SSD (12) and the second SSD (22) to operate based on the aforesaid clock signals.

From the above, it can be inferred that when the primary controller, i.e., the first controller (100), fails to operate properly and the backup second controller (200) has not yet completed the takeover process, the first SSD (12) and the second SSD (22) will inevitably lack clock signals from either controller (100 or 200) to follow. As a result, the SSDs (12, 22) have to pause their ongoing operations, leading to access latency and degradation in system performance. This represents the first issue encountered in the conventional storage system architecture (1A).

Please refer to FIG. 1B, which is a block diagram illustrating another conventional storage system architecture (1B), referred to as "storage system architecture (1B)" hereinafter. The storage system architecture (1B) comprises a host (15) and a redundant array of independent disks subsystem (3B), also referred to as "RAID subsystem (3B)". The RAID subsystem (3B) comprises a controller pair, a plurality of SSD units (301) and a plurality of distributors (113, 115, 117, 213, 215, 217). The controller pair comprises a first controller (100) and a second controller (200). The plurality of SSD units (301) comprise a 1st SSD unit (301a), a 2nd SSD unit (301b), a 3rd SSD unit (301c), a 4th SSD unit (301d), a 5th SSD unit (301e), a 6th SSD unit (301f), a 7th SSD unit (301g), an 8th SSD unit (301h), a 9th SSD unit (301i), a 10th SSD unit (301j), an 11th SSD unit (301k), a 12th SSD unit (301l), a 13th SSD unit (301m), a 14th SSD unit (301n), a 15th SSD unit (3010), a 16th SSD unit (301p), a 17th SSD unit (301q), an 18th SSD unit (301r), a 19th SSD unit (301s), a 20th SSD unit (301t), a 21st SSD unit (301u), a 22nd SSD unit (301v), a 23rd SSD unit (301w), and a 24th SSD unit (301x). The RAID subsystem (3B) depicted in FIG. 1B is similar to the RAID subsystem (3A) depicted in FIG. 1A, with the difference being that the RAID subsystem (3B) comprises more SSD units (301) and additional six distributors (113, 115, 117, 213, 215, 217).

In the architecture of the RAID subsystem (3B) in FIG. 1B, due to the need for the two controllers (100, 200) to connect to more SSD units (301) and provide clock signals to these SSD units (301), it is necessary to use the distributors (113, 115, 117, 213, 215, 217) to assist in routing a plurality of clock signal lines to each of the SSD units (301). Taking FIG. 1B as an example, the first device-side I/O controller (1007) of the first controller (100) routes three clock signal lines to three associated distributors (113, 115, 117), and each of the three distributors (113, 115, 117) routes eight clock signal lines to the corresponding SSD units (301). In this way, a total of twenty-four clock signal lines cover all the SSD units (301a-301x) as shown in FIG. 1B. More specifically, the distributor (113) routes eight clock signal lines (i.e., clock signal line #1 to clock signal line #8) to the 1st SSD unit (301a) to the 8th SSD unit (301h); the distributor (115) routes eight clock signal lines (i.e., clock signal line #9 to clock signal line #16) to the 9th SSD unit (301i) to the 16th SSD unit (301p); and the distributor (117) routes eight clock signal lines (i.e., clock signal line #17 to clock signal line #24) to the 17th SSD unit (301q) to the 24th SSD unit (301x).

Similarly, in order to provide the clock signals to all SSD units (301a to 301x), the second device-side I/O controller (2007) of the second controller (200) routes three clock signal lines to three distributors (213, 215, 217), and each of the three distributors (213, 215, 217) routes eight clock signal lines to the corresponding SSD units (301). In this way, a total of twenty-four clock signal lines cover all the SSD units (301a-301x) as shown in FIG. 1B.

As can be seen from the above, in the architecture of the conventional RAID subsystem (3B) shown in FIG. 1B, the redundant controller pair needs to rely on the distributors (113, 115, 117, 213, 215, and 217) to couple to a larger number of SSD units (301). However, since these distributors (113, 115, 117, 213, 215, 217) lack redundant backup designs, if any one of the distributors (113, 115, 117, 213, 215, and 217) fails and cannot operate properly, the multiple SSD units (301) relying on the failed distributors for clock signal provision, will be unable to receive clock signals from the controllers (100, 200). As a result, these SSD units (301) will be unable to operate normally, leading to system performance degradation. For example, if the distributor (113) fails and cannot function properly, the first SSD unit (301a) to the eighth SSD unit (301h) connected to the distributor (113) will all fail and be unable to operate normally, resulting in degraded performance of the entire storage system architecture (1B). From this, it can be seen that this conventional storage system architecture (1B) may exhibit vulnerability in the design of the redundant controller pair due to a distributor failure. This represents the second issue encountered in the conventional storage system architecture (1B).

In addition, in order to provide clock signals from the device-side I/O controllers (1007, 2007) of the two controllers (100, 200) to the plurality of SSD units (301), expensive and precise distributors capable of synchronously providing signals are required to route multiple clock signal lines to different SSD units (301), which inadvertently increases the overall costs of the conventional storage system. This is the third issue faced by the conventional storage system architecture (1B). Furthermore, the distributors themselves require a certain amount of space for being installed. Therefore, the routing between the distributors and the SSD units (301) must be designed and layouted according to routing rules, taking into consideration the crowded space caused by the distributors, in order to avoid signal attenuation and signal interference (e.g., Electromagnetic Interference (EMI)). Consequently, the factors of space occupied by the distributors and the higher costs both significantly increase system costs and implementation difficulty. This is the fourth issue currently faced by the conventional storage system architecture (1B).

In summary, providing a data access method with a lower cost, higher reliability, and higher performance to facilitate the connection between a single-port storage device and the two controllers is an urgent issue in the storage industry.

SUMMARY OF THE INVENTION

In light of the above issues, it is an object of the present invention to provide a data access method applied to a RAID subsystem (4D, 4E), wherein the RAID subsystem (4D, 4E) comprises a first storage virtualization controller (SVC 1) (10), a second storage virtualization controller (SVC 2) (20), a first switch (switch 1) (109), a second switch (switch 2) (209), a first physical storage device (PSD 1) (9, 9a), a backplane (401), and a first clock generation circuit (clock generation circuit 1) (85, 85a), the method comprising: installing the first clock generation circuit (clock generation circuit 1) (85, 85a) on the backplane (401), the first clock generation circuit (clock generation circuit 1) (85, 85a) being configured to provide a first dedicated clock signal to the first physical storage device (PSD 1) (9, 9a); coupling a first half (half portion 1) (901) of a single port of the first physical storage device (PSD 1) (9, 9a) to the first storage virtualization controller (SVC 1) (10) via the first switch (switch 1) (109); coupling a second half (half portion 2) (902) of the single port of the first physical storage device (PSD 1) (9, 9a) to the second storage virtualization controller (SVC 2) (20) via the second switch (switch 2) (209); configuring the first storage virtualization controller (SVC 1) (10) as a user of the first physical storage device (PSD 1) (9, 9a); receiving, by the first physical storage device (PSD 1) (9, 9a), at least one first input/output (I/O) request from the first storage virtualization controller (SVC 1) (10) and processing the at least one first I/O request based on the first dedicated clock signal provided by the first clock generation circuit (clock generation circuit 1) (85, 85a); configuring the second storage virtualization controller (SVC 2) (20) as the user of the first physical storage device (PSD 1) (9, 9a); and receiving, by the first physical storage device (PSD 1) (9, 9a), at least one second I/O request from the second storage virtualization controller (SVC 2) (20) via the second half (half portion 2) (902) of the single port and processing the at least one second I/O request based on the first dedicated clock signal provided by the first clock generation circuit (clock generation circuit 1) (85, 85a).

According to one embodiment of the present invention, the step of configuring the first storage virtualization controller (SVC 1) (10) as a user of the first physical storage device (PSD 1) (9, 9a) further comprises: enabling, by the first storage virtualization controller (SVC 1) (10), at least one first lane coupled to the first physical storage device (PSD 1) (9, 9a), wherein the at least one first lane corresponds to a lane of the first half (half portion 1) (901) of the single port of the first physical storage device (PSD 1) (9, 9a); sending, by the first storage virtualization controller (SVC 1) (10), a first reset signal to the first physical storage device (PSD 1) (9, 9a) to request the first physical storage device (PSD 1) (9, 9a) to configure the first storage virtualization controller (SVC 1) (10) as its user; verifying, by the first storage virtualization controller (SVC 1) (10), the at least one first lane; sequencing, by the first storage virtualization controller (SVC 1) (10), the at least one first lane; and utilizing, by the first storage virtualization controller (SVC 1) (10), the at least one first lane.

According to one embodiment of the present invention, the step of configuring the first storage virtualization controller (SVC 1) (10) as a user of the first physical storage device (PSD 1) (9, 9a) further comprises: determining mutually, by the first storage virtualization controller (SVC 1) (10) and the second storage virtualization controller (SVC 2) (20), via a redundant controller communicating interconnect (7), that the first storage virtualization controller (SVC 1) (10) is a primary controller of the first physical storage device (PSD 1) (9, 9a).

According to one embodiment of the present invention, the redundant controller communicating interconnect (7) is selected from one of the following communication interconnect combinations, comprising: Peripheral Component Interconnect Express (PCI Express, PCI-E), Ethernet, Remote Direct Memory Access (RDMA), Fiber Channel-Arbitrated Loop (FC-AL), parallel Small Computer System Interface (parallel SCSI) operating in a target mode, and Serial Advanced Technology Attachment (SATA) operating in a target mode.

According to one embodiment of the present invention, the step of configuring the second storage virtualization controller (SVC 2) (20) as a user of the first physical storage device (PSD 1) (9, 9a) further comprises: enabling, by the second storage virtualization controller (SVC 2) (20), at least one second lane coupled to the first physical storage device (PSD 1) (9, 9a), wherein the at least one second lane corresponds to a lane of the second half (half portion 2) (902) of the single port of the first physical storage device (PSD 1) (9, 9a); sending, by the second storage virtualization controller (SVC 2) (20), a second reset signal to the first physical storage device (PSD 1) (9, 9a) for requesting the first physical storage device (PSD 1) (9, 9a) to set the second storage virtualization controller (SVC 2) (20) as its user; verifying, by the second storage virtualization controller (SVC 2) (20), the at least one second lane; sequencing, by the second storage virtualization controller (SVC 2) (20), the at least one second lane; and utilizing, by the second storage virtualization controller (SVC 2) (20), the at least one second lane.

According to one embodiment of the present invention, the first clock generation circuit (clock generation circuit 1) (85, 85a) provides the first dedicated clock signal to the first physical storage device (PSD 1) (9, 9a) in a one-to-one manner.

According to one embodiment of the present invention, the first storage virtualization controller (SVC 1) (10) and the second storage virtualization controller (SVC 2) (20) do not require additional circuit components to assist in routing their clock signals to the first physical storage device (PSD 1) (9, 9a).

According to one embodiment of the present invention, the data access method further comprises that the second storage virtualization controller (SVC 2) (20) determines, through a monitoring mechanism, that the first storage virtualization controller (SVC 2) (10) is not functioning properly.

According to one embodiment of the present invention, the monitoring mechanism comprises a step of sending, by the first storage virtualization controller (SVC 1) (10), a confirmation signal to the second storage virtualization controller (SVC2) (20) at each first time interval.

According to one embodiment of the present invention, the monitoring mechanism comprises a step of sending, by the second storage virtualization controller (SVC 2) (20), a query signal to the first storage virtualization controller (SVC 1) (10) at each second time interval and waiting for a response signal from the first storage virtualization controller (SVC 1) (10).

According to one embodiment of the present invention, the first clock generation circuit (clock generation circuit 1) (85, 85a) is a component directly mounted on the backplane (401).

According to one embodiment of the present invention, the first clock generation circuit (clock generation circuit 1) (85, 85a) is coupled to a first socket on the backplane (401).

According to one embodiment of the present invention, the first clock generation circuit (clock generation circuit 1) (85, 85a) is coupled to the first socket on the backplane (401) via a first interposer.

According to one embodiment of the present invention, the first storage virtualization controller (SVC 1) (10), the second storage virtualization controller (SVC 2) (20), the first switch (switch 1) (109), and the second switch (switch 2) (209) are separate and independent circuitries, respectively.

According to one embodiment of the present invention, the first switch (switch 1) (109) and the second switch (switch 2) (209) are respectively integrated into the first storage virtualization controller (SVC 1) (10) and the second storage virtualization controller (SVC 2) (20).

According to one embodiment of the present invention, the first switch (switch 1) (109) and the second switch (switch 2) (209) are integrated into a single switch, through which the first storage virtualization controller (SVC 1) (10) and the second storage virtualization controller (SVC2) (20) are respectively coupled to the first physical storage device (PSD 1) (9, 9a).

According to one embodiment of the present invention, during a process of switching the user of the first physical storage device (PSD 1) (9, 9a) from the first storage virtualization controller (SVC 1) (10) to the second storage virtualization controller (SVC 2) (20), the first physical storage device (PSD 1) (9, 9a) continues to process the at least one first I/O request issued by the first storage virtualization controller (SVC 1) (10) based on the first dedicated clock signal provided by the first clock generation circuit (clock generation circuit 1) (85, 85a).

According to one embodiment of the present invention, during a process of switching the user of the first physical storage device (PSD 1) (9, 9a) from the first storage virtualization controller (SVC 1) (10) to the second storage virtualization controller (SVC 2) (20), the first physical storage device (PSD 1) (9, 9*a*) stops executing the at least one first I/O request issued by the first storage virtualization controller (SVC 1) (10).

According to one embodiment of the present invention, the RAID subsystem (4D, 4E) further comprises a second physical storage device (PSD 2) (9, 9*b*) and a second clock generation circuit (clock generation circuit 2) (85, 85*b*), the method further comprising: installing the second clock generation circuit (clock generation circuit 2) (85, 85*b*) on the backplane (401), the second clock generation circuit (clock generation circuit 2) (85, 85*b*) being configured to provide a second dedicated clock signal to the second physical storage device (PSD 2) (9, 9*b*); coupling a first half (half portion 1) (901) of a single port of the second physical storage device (PSD 2) (9, 9*b*) to the second storage virtualization controller (SVC 2) (20) via the second switch (switch 2) (209); coupling a second half (half portion 2) (902) of the single port of the second physical storage device (PSD 2) (9, 9*b*) to the first storage virtualization controller (SVC 1) (10) via the first switch (switch 1) (109); configuring the second storage virtualization controller (SVC 2) (20) as a user of the second physical storage device (PSD 2) (9, 9*b*); receiving, by the second physical storage device (PSD 2) (9, 9*b*), at least one second I/O request from the second storage virtualization controller (SVC 2) (20) via the first half (half portion 1) (901) of the single port, and processing the at least one second I/O request based on the second dedicated clock signal provided by the second clock generation circuit (clock generation circuit 2) (85, 85*b*); sending, by the first storage virtualization controller (SVC 1) (10), a reset signal to the first switch (switch 1) (109), thereby configuring the user of the second physical storage device (PSD 2) (9, 9*b*) as the first storage virtualization controller (SVC 1) (10); and processing, by the second physical storage device (PSD 2) (9, 9*b*), at least one third I/O request issued by the first storage virtualization controller (SVC 1) (10) via lanes of the second half (half portion 2) (902), based on the second dedicated clock signal provided by the second clock generation circuit (clock generation circuit 2) (85, 85*b*).

According to one embodiment of the present invention, the second clock generation circuit (clock generation circuit 2) (85, 85*b*) provides the second dedicated clock signal to the second physical storage device (PSD 2) (9, 9*b*) in a one-to-one manner.

In light of the above issues, it is another object of the present invention to provide a RAID (redundant array of independent disks) subsystem (4D, 4E), which is coupled to a host (15) and is configured to receive and process at least one access request from the host (15), the RAID subsystem (4D, 4E) comprising: a first storage virtualization controller (SVC 1) (10) comprising a first switch (switch 1) (109); a second storage virtualization controller (SVC 2) (20) comprising a second switch (switch 2) (209) and communicating with the first storage virtualization controller (SVC 1) (10) via a redundant controller communicating interconnect (7); a first physical storage device (PSD 1) (9, 9*a*) comprising a single port, wherein lanes of the single port are divided into a first half (half portion 1) (901) and a second half (half portion 2) (902), wherein the first half (half portion 1) (901) is coupled to the first switch (switch 1) (109) of the first storage virtualization controller (SVC 1) (10), and the second half (half portion 2) (902) is coupled to the second switch (switch 2) (209) of the second storage virtualization controller (SVC 2) (20); and a first clock generation circuit (clock generation circuit 1) (85, 85*a*) being coupled to the first physical storage device (PSD 1) (9, 9*a*) for providing a first dedicated clock signal to the first physical storage device (PSD 1) (9, 9*a*); wherein when the first storage virtualization controller (SVC 1) (10) and the second storage virtualization controller (SVC 2) (20) determine, via the redundant controller communicating interconnect (7), that the first storage virtualization controller (SVC 1) (10) is a user of the first physical storage device (PSD 1) (9, 9*a*), the first storage virtualization controller (SVC 1) (10) configures itself as the user of the first physical storage device (PSD 1) (9, 9*a*) and sends at least one first input/output (I/O) request to the first physical storage device (PSD 1) (9, 9*a*) through the first switch (switch 1) (109), wherein the first physical storage device (PSD 1) (9, 9*a*) processes the at least one first I/O request based on the first dedicated clock signal provided by the first clock generation circuit (clock generation circuit 1) (85, 85*a*); and wherein when the user of the first physical storage device (PSD 1) (9, 9*a*) switches to the second storage virtualization controller (SVC 2) (20), the second storage virtualization controller (SVC 2) (20) configures itself as the user of the first physical storage device (PSD 1) (9, 9*a*) and sends at least one second input/output (I/O) request to the first physical storage device (PSD 1) (9, 9*a*) through the second switch (switch 2) (209), wherein the first physical storage device (PSD 1) (9, 9*a*) processes the at least one second I/O request based on the first dedicated clock signal provided by the first clock generation circuit (clock generation circuit 1) (85, 85*a*).

According to one embodiment of the present invention, the first storage virtualization controller (SVC 1) (10) further comprises: a first central processing circuitry (CPC 1) (103) for processing the at least one access request from the host (15); and a first device-side input/output (I/O) device interconnect controller (device-side I/O device interconnect controller 1) (107) for receiving messages and commands from the first central processing circuitry (CPC 1) (103), and being coupled to the first physical storage device (PSD 1) (9, 9*a*) via the first switch (switch 1) (109) to serve as an interface and a buffer between the first physical storage device (PSD 1) (9, 9*a*) and the first central processing circuit (CPC 1) (103).

According to one embodiment of the present invention, the first switch (switch 1) (109) is integrated into the first device-side I/O device interconnect controller (device-side I/O device interconnect controller 1) (107).

According to one embodiment of the present invention, the first switch (switch 1) (109) and the first device-side I/O device interconnect controller (device-side I/O device interconnect controller 1) (107) are integrated into the first central processing circuitry (CPC 1) (103).

According to one embodiment of the present invention, the second storage virtualization controller (SVC 2) (20) further comprises: a second central processing circuitry (CPC 2) (203) for processing the at least one access request from the host (15); and a second device-side input/output (I/O) device interconnect controller (device-side I/O device interconnect controller 2) (207) for receiving messages and commands from the second central processing circuitry (CPC 2) (203), and being coupled to the first physical storage device (PSD 1) (9, 9*a*) via the second switch (switch 2) (209) to serve as an interface and a buffer between the first physical storage device (PSD 1) (9, 9*a*) and the second central processing circuitry (CPC 2) (203).

According to one embodiment of the present invention, the second switch (switch 2) (209) is integrated into the second device-side I/O device interconnect controller (device-side I/O device interconnect controller 2) (207).

According to one embodiment of the present invention, the second switch (switch 2) (209) and the second device-side I/O device interconnect controller (device-side I/O device interconnect controller 2) (207) are integrated into the second central processing circuitry (CPC 2) (203).

According to one embodiment of the present invention, the redundant controller communicating interconnect (7) is selected from one of the following communication interconnect combinations, comprising: Peripheral Component Interconnect Express (PCI Express, PCI-E), Ethernet, Remote Direct Memory Access (RDMA), Fiber Channel-Arbitrated Loop (FC-AL), parallel Small Computer System Interface (parallel SCSI) operating in a target mode, and Serial Advanced Technology Attachment (SATA) operating in a target mode.

According to one embodiment of the present invention, the first clock generation circuit (clock generation circuit 1) (85, 85a) provides the first dedicated clock signal to the first physical storage device (PSD 1) (9, 9a) in a one-to-one manner.

According to one embodiment of the present invention, the first storage virtualization controller (SVC 1) (10) and the second storage virtualization controller (SVC 2) (20) do not require additional circuit components to assist in routing their clock signals to the first physical storage device (PSD 1) (9, 9a).

According to one embodiment of the present invention, the first storage virtualization controller (SVC 1) (10), the second storage virtualization controller (SVC 2) (20), the first switch (switch 1) (109), and the second switch (switch 2) (209) are separate and independent circuitries, respectively.

According to one embodiment of the present invention, the first switch (switch 1) (109) and the second switch (switch 2) (209) are respectively integrated into the first storage virtualization controller (SVC 1) (10) and the second storage virtualization controller (SVC 2) (20).

According to one embodiment of the present invention, the first switch (switch 1) (109) and the second switch (switch 2) (209) are integrated into a single switch, through which the first storage virtualization controller (SVC 1) (10) and the second storage virtualization controller (SVC2) (20) are respectively coupled to the first physical storage device (PSD 1) (9, 9a).

According to one embodiment of the present invention, the RAID subsystem (4D, 4E) further comprises a backplane (401), wherein the first clock generation circuit (clock generation circuit 1) (85, 85a) is directly mounted on the backplane (401) and coupled to the first physical storage device (PSD 1) (9, 9a) via the backplane (401).

According to one embodiment of the present invention, the RAID subsystem (4D, 4E) further comprises a backplane (401), wherein the first clock generation circuit (clock generation circuit 1) (85, 85a) is coupled to a first socket on the backplane (401) and coupled to the first physical storage device (PSD 1) (9, 9a) via the backplane (401).

According to one embodiment of the present invention, the first clock generation circuit (clock generation circuit 1) (85, 85a) is coupled to the first socket on the backplane (401) via a first interposer.

According to one embodiment of the present invention, the RAID subsystem (4D, 4E) further comprises a first interposer, the first interposer comprising the first clock generation circuit (clock generation circuit 1) (85, 85a) and a slot, the slot being configured to accommodate the first physical storage device (PSD 1) (9, 9a), thereby enabling the first physical storage device (PSD 1) (9, 9a) to be coupled to the first storage virtualization controller (SVC 1) (10) and the second storage virtualization controller (SVC 2) (20).

According to one embodiment of the present invention, when the user of the first physical storage device (PSD 1) (9, 9a) is switched from the first storage virtualization controller (SVC 1) (10) to the second storage virtualization controller (SVC 2) (20), the first physical storage device (PSD 1) (9, 9a) continues to process the at least one first I/O request from the first storage virtualization controller (SVC 1) (10) based on the first dedicated clock signal provided by the first clock generation circuit (clock generation circuit 1) (85, 85a).

According to one embodiment of the present invention, when the user of the first physical storage device (PSD 1) (9, 9a) is switched from the first storage virtualization controller (SVC 1) (10) to the second storage virtualization controller (SVC 2) (20), the first physical storage device (PSD 1) (9, 9a) stops executing the at least one first I/O request from the first storage virtualization controller (SVC 1) (10).

According to one embodiment of the present invention, the first storage virtualization controller (SVC 1) (10) configures itself as the user of the first physical storage device (PSD 1) (9, 9a) by performing the following steps: enabling at least one first lane coupled to the first physical storage device (PSD 1) (9, 9a); sending a first reset signal to the first physical storage device (PSD 1) (9, 9a) to request the first physical storage device (PSD 1) (9, 9a) to configure the first storage virtualization controller (SVC 1) (10) as its user; verifying the at least one first lane; sequencing the at least one first lane; and utilizing the at least one first lane, wherein the at least one first lane corresponds to a lane of the first half (half portion 1) (901) of the single port of the first physical storage device (PSD 1) (9, 9a).

According to one embodiment of the present invention, the second storage virtualization controller (SVC 2) (20) configures itself as the user of the first physical storage device (PSD 1) (9, 9a) by performing the following steps: enabling at least one second lane coupled to the first physical storage device (PSD 1) (9, 9a); sending a second reset signal to the first physical storage device (PSD 1) (9, 9a) to request the first physical storage device (PSD 1) (9, 9a) to configure the second storage virtualization controller (SVC 2) (20) as its user; verifying the at least one second lane; sequencing the at least one second lane; and utilizing the at least one second lane, wherein the at least one second lane corresponds to a lane of the second half (half portion 2) (902) of the single port of the first physical storage device (PSD 1) (9, 9a).

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a flowchart regarding the process of configuring the user of the PSDs according to one embodiment of the present invention.

FIG. 6 is a flowchart regarding the operation of the PSDs under the normal operating mode of the primary controller according to one embodiment of the present invention.

DETAILED DESCRIPTION

In this specification and the claims thereof, some terms are used to describe some specific components or elements. However, a skilled person in the art generally understands that hardware manufacturers may use different terms to refer to the same components or elements. The specification and the claims thereof do not distinguish the components or elements based on differences in names, but rather on differences in functionality. The term "comprise" or "include" as mentioned in the specification and the claims thereof, is an open term, which should be interpreted as comprise/include but not limited to". In addition, the term "coupling" herein encompasses any direct and indirect electrical connection means. Therefore, if in the specification, it is described that a first device is coupled to a second device, it means that the first device may be directly electrically connected to the second device or indirectly electrically connected to the second device through other devices or connection means.

Figure 2A:
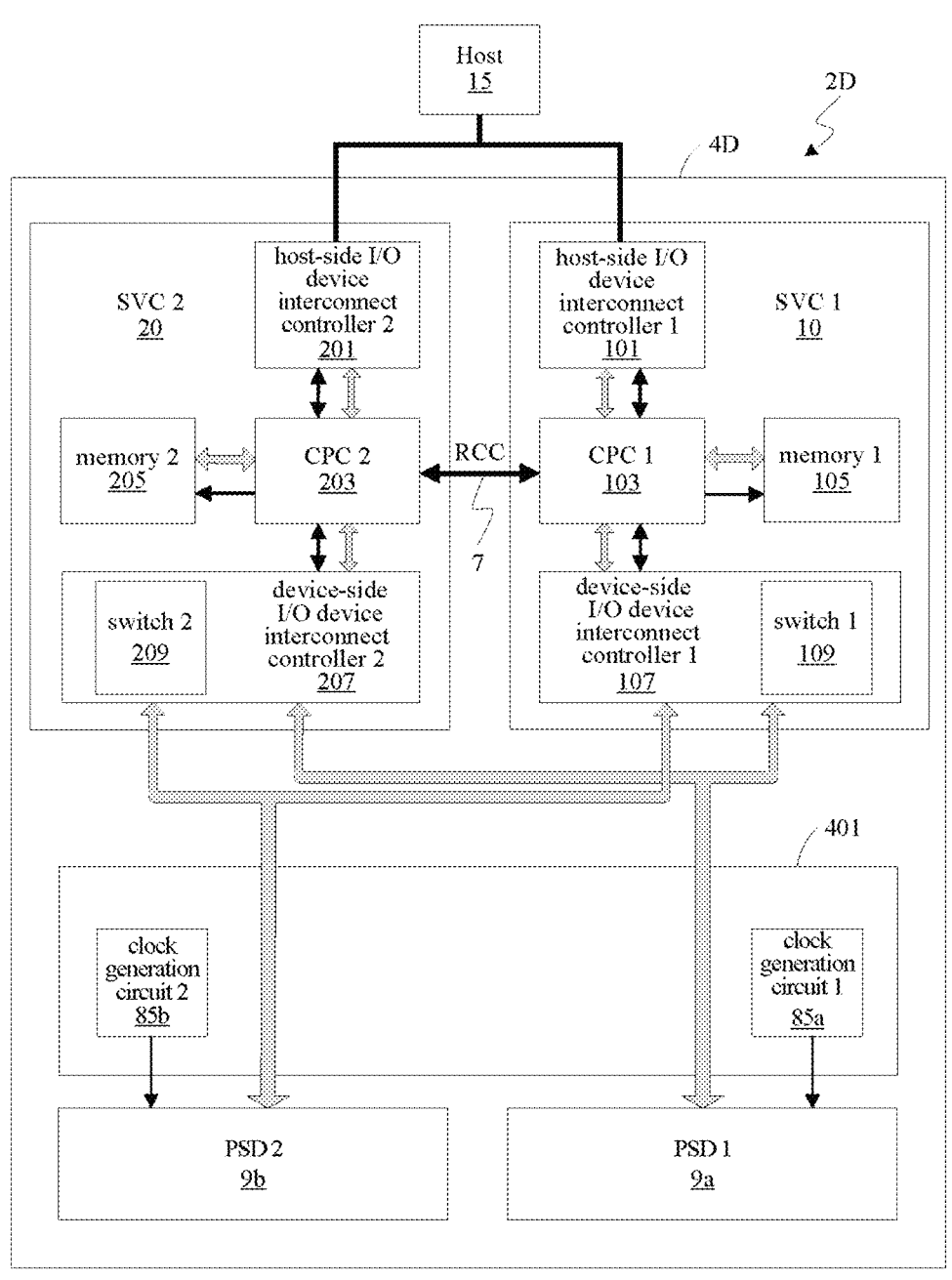
FIG. 2A and FIG. 2B illustrate block diagrams of two embodiments of the storage system architecture (2D) according to the present invention.
Figure 2B:
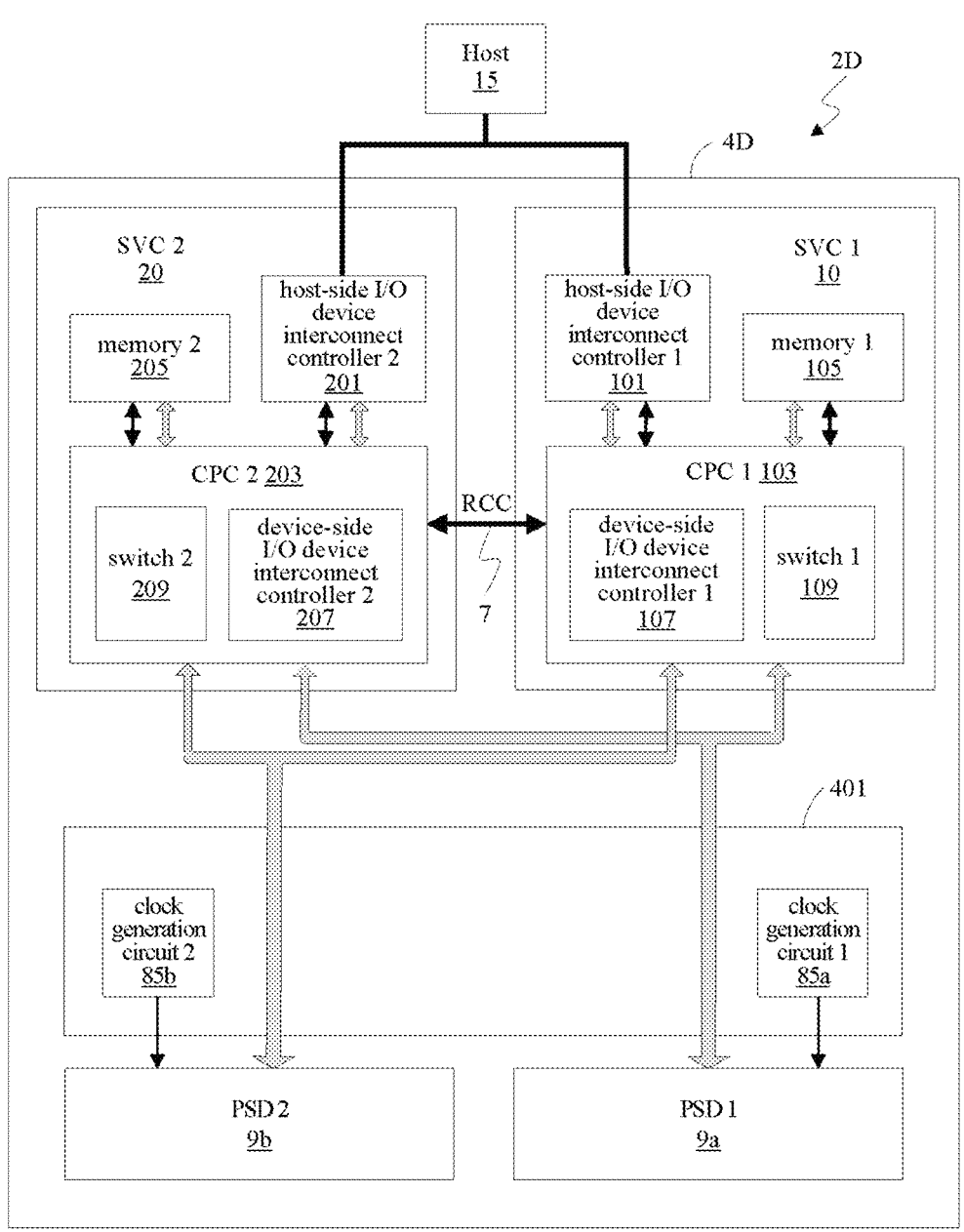

Please refer to FIG. 2A and FIG. 2B, which are block diagrams illustrating two embodiments of a storage system architecture (2D) according to the present invention. The storage system architecture (2D) comprises a host (15) and a redundant array of independent disks (RAID) subsystem (4D), hereinafter referred to as the "RAID subsystem (4D)". The RAID subsystem (4D) comprises a storage virtualization controller pair (SVC pair) composed of two storage virtualization controllers (SVCs) (10, 20), a plurality of physical storage devices (PSDs) (9*a*, 9*b*), a backplane (401), a plurality of clock generation circuits (85*a*, 85*b*), and a plurality of switches (109, 209), wherein the plurality of clock generation circuits (85*a*, 85*b*) are installed on the backplane (401) and coupled to the plurality of PSDs (9*a*, 9*b*), respectively. The plurality of switches (109, 209) include a first switch (switch 1) (109) and a second switch (switch 2) (209). The two SVCs (10, 20) are respectively coupled to the PSDs (9*a*, 9*b*) via their corresponding first switch (switch 1) (109) and second switch (switch 2) (209). In practical applications, according to one embodiment of the present invention, the first switch (switch 1) (109) and the second switch (switch 2) (209) are PCIe switches.

According to one embodiment of the present invention, the plurality of clock generation circuits (85*a*, 85*b*) are components directly mounted on the backplane (401). In another embodiment of the present invention, the backplane (401) includes a plurality of sockets for accommodating the plurality of clock generation circuits (85*a*, 85*b*), such that the plurality of clock generation circuits (85*a*, 85*b*) can be conveniently replaced as needed. According to yet another embodiment of the present invention, the backplane (401) includes a first socket (socket 1) and a second socket (socket 2), which are designed to respectively accommodate a first interposer (interposer 1) and a second interposer (interposer 2). The first interposer (interposer 1) and the second interposer (interposer 2) are each installed with one of the plurality of clock generation circuits (85*a*, 85*b*) for respectively providing dedicated clock signals to the PSDs (9*a*, 9*b*) coupled to the first interposer (interposer 1) and the second interposer (interposer 2). The PSDs (9*a*, 9*b*) are respectively coupled to the first interposer (interposer 1) and the second interposer (interposer 2) and further respectively coupled, via the first interposer (interposer 1) and the second interposer (interposer 2), to the first switch (switch 1) (109) and the second switch (switch 2) (209) of the two SVCs (10, 20). Thus, through this design, either or both of the first interposer (interposer 1) and the second interposer (interposer 2) can be removed as needed, allowing convenient replacement of the clock generation circuits (85*a*, 85*b*) mounted on the interposers (interposer 1 and interposer 2). According to yet another embodiment of the present invention, the plurality of clock generation circuits (85*a*, 85*b*) are respectively installed, in a one-to-one manner, on the first interposer (interposer 1) and the second interposer (interposer 2). The first interposer (interposer 1) and the second interposer (interposer 2) each include a slot designed for accommodating one of the corresponding PSDs (9*a*, 9*b*), and facilitate the coupling of the attached PSDs (9*a*, 9*b*) to the two storage virtualization controllers (SVC1 and SVC2) (10, 20). Therefore, through this design, either or both of the first interposer (interposer 1) and the second interposer (interposer 2) can be removed as needed, providing convenient replacement of the clock generation circuits (85*a*, 85*b*) installed on the first interposer (interposer 1) and the second interposer (interposer 2).

In order to enhance the reliability of data storage systems, it is common to utilize redundant architecture in which two SVCs (for example, a first SVC (SVC 1) (10) and a second SVC (SVC 2) (20)) are configured as an SVC pair. This configuration ensures that when one SVC (e.g., SVC 1 (10)) fails or malfunctions, the other SVC (e.g., SVC 2 (20)) can take over the tasks originally handled by the failed SVC, such as taking over the PSDs originally managed by the failed SVC. As a result, the host can continue to access all PSDs (9) without interruption. Therefore, in the RAID subsystem (4D) of the storage system architecture (2D), the first SVC (SVC 1) (10) and the second SVC (SVC 2) (20) are configured as the SVC pair in order to provide mutual redundancy.

There is a redundant controller communicating (RCC) interconnect (7) between the first SVC (SVC 1) (10) and the second SVC (SVC 2) (20). Through this RCC interconnect (7), the first SVC (SVC 1) (10) and the second SVC (SVC 2) (20) establish an inter-controller communications channel (ICC) between each other in order to exchange data or messages. A common implementation of the ICC is to use a certain communication interconnect such as PCI Express (PCI-E), Ethernet, Remote Direct Memory Access (RDMA), Fiber Channel-Arbitrated Loop (FC-AL), Parallel Small Computer System Interface (Parallel SCSI) operating in a target mode, or Serial Advanced Technology Attachment (SATA) operating in a target mode, among others, but not limited thereto.

The first SVC (SVC 1) (10) comprises a first host-side input/output (I/O) device interconnect controller (host-side I/O device interconnect controller 1) (101), a first central processing circuitry (CPC 1) (103), a first memory (memory 1) (105), a first device-side input/output (I/O) device interconnect controller (device-side I/O device interconnect controller 1) (107), and a first switch (switch 1) (109). According to the embodiment shown in FIG. 2A, the first switch (switch 1) (109) is integrated into the first device-side I/O device interconnect controller (device-side I/O device interconnect controller 1) (107). According to the embodiment shown in FIG. 2B, the first device-side I/O device interconnect controller (device-side I/O device interconnect controller 1) (107) and the first switch (switch 1) (109) are both integrated into the first CPC (CPC 1) (103). In another embodiment of the present invention, the first device-side I/O device interconnect controller (device-side I/O device interconnect controller 1) (107), the first switch (switch 1) (109), and the first CPC (CPC 1) (103) may be independent components that are separate from one another.

The first host-side I/O device interconnect controller (host-side I/O device interconnect controller 1) (101) of the first SVC (SVC 1) (10) is respectively coupled to the host (15) and the first CPC (CPC 1) (103) to receive access requests from the host (15) and to convert and/or map them to the first CPC (CPC 1) (103).

The first CPC (CPC 1) (103) of the first SVC (SVC 1) (10) is used to process and/or monitor access requests from the host (15).

The first memory (memory 1) (105) of the first SVC (SVC 1) (10) is coupled to the first CPC (CPC 1) (103), and serves as a buffer for temporarily storing data transmitted between the host (15) and the plurality of PSDs (9a, 9b) via the first CPC (CPC 1) (103).

The first device-side I/O device interconnect controller (device-side I/O device interconnect controller 1) (107) of the first SVC (SVC 1) (10) receives messages and requests from the first CPC (CPC 1) (103) and is coupled, via the first switch (switch 1) (109), to the plurality of PSDs (9a, 9b) on the device side. It serves as an interface and buffer between the plurality of PSDs (9a, 9b) and the first CPC (CPC 1) (103). For example, the first device-side I/O device interconnect controller (device-side I/O device interconnect controller 1) (107) receives control signals, I/O requests and related data from the first CPC (CPC 1) (103), and through the mediation of the first switch (switch 1) (109), converts and/or maps the I/O requests and the related data originating from the first CPC (CPC 1) (103) to the plurality of PSDs (9a, 9b). Additionally, the first device-side I/O device interconnect controller (device-side I/O device interconnect controller 1) (107) receives data and signals originating from the plurality of PSDs (9a, 9b) through the mediation of the switch 1 (109). Furthermore, the first device-side I/O device interconnect controller (device-side I/O device interconnect controller 1) (107) also obtains information about the connection and operating status of the plurality of PSDs (9a, 9b) via the first switch (switch 1) (109).

Similarly, the second SVC (SVC 2) (20) comprises a second host-side I/O device interconnect controller (host-side I/O device interconnect controller 2) (201), a second central processing circuitry (CPC 2) (203), a second memory (memory 2) (205), a second device-side I/O device interconnect controller (device-side I/O device interconnect controller 2) (207), and a second switch (switch 2) (209).

According to the embodiment shown in FIG. 2A, the second switch (switch 2) (209) is integrated into the second device-side I/O device interconnect controller (device-side I/O device interconnect controller 2) (207). In the embodiment shown in FIG. 2B, the second device-side I/O device interconnect controller (device-side I/O device interconnect controller 2) (207) and the second switch (switch 2) (209) are both integrated into the second CPC (CPC 2) (203). In another embodiment of the present invention, the second device-side I/O device interconnect controller (device-side I/O device interconnect controller 2) (207), the second switch (switch 2) (209), and the second CPC (CPC 2) (203) may be independent components that are separate from one another.

The second host-side I/O device interconnect controller (host-side I/O device interconnect controller 2) (201) of the second SVC (SVC 2) 20 is respectively coupled to the host (15) and the second CPC (CPC 2) (203) to receive access requests from the host (15) and to convert and/or map them to the second CPC (CPC 2) (203).

The second CPC (CPC 2) (203) of the second SVC (SVC 2) (20) is used to process and/or monitor access requests from the host (15).

The second memory (memory 2) (205) of the second SVC (SVC 2) (20) is coupled to the second CPC (CPC 2) (203), and serves as a buffer for temporarily storing data transmitted between the host (15) and the plurality of PSDs (9a, 9b) via the second CPC (CPC 2) (203).

The second device-side I/O device interconnect controller (device-side I/O device interconnect controller 2) (207) of the second SVC (SVC 2) (20) receives messages and requests from the second CPC (CPC 2) (203), and is coupled to the plurality of PSDs (9a, 9b) via the second switch (switch 2) (209). It serves as an interface and buffer between the plurality of PSDs (9a, 9b) and the second CPC (CPC 2) (203). For example, the second device-side I/O device interconnect controller (device-side I/O device interconnect controller 2) (207) receives control signals, I/O requests, and related data from the second CPC (CPC 2) (203), and through the mediation of the second switch (switch 2) (209), converts and/or maps the I/O requests and related data originating from the second CPC (CPC 2) (203) to the plurality of PSDs (9a, 9b). Additionally, the second device-side I/O device interconnect controller (device-side I/O device interconnect controller 2) (207) receives data and signals originating from the plurality of PSDs (9a, 9b) through the mediation of the second switch (switch 2) (209). Furthermore, the second device-side I/O device interconnect controller (device-side I/O device interconnect controller 2) (207) also obtains information about the connection and operating status of the plurality of PSDs (9a, 9b) via the second switch (switch 2) (209).

The first clock generation circuit (clock generation circuit 1) (85a) is a dedicated clock generation circuit for the first PSD (PSD 1) (9a), and it independently provides a first clock signal to the first PSD (PSD 1) (9a), enabling the first PSD (PSD 1) (9a) to operate properly based on the first clock signal. Similarly, the second clock generation circuit (clock generation circuit 2) (85b) is a dedicated clock generation circuit for the second PSD (PSD 2) (9b) and it independently provides a second clock signal to the second PSD (PSD 2) (9b), enabling the second PSD (PSD 2) (9b) to operate properly based on the second clock signal. In other words, the first clock generation circuit (clock generation circuit 1) (85a) and the second clock generation circuit (clock generation circuit 2) (85b) are independently operating components that are not controlled by the SVCs (10, 20) or by the switches (109, 209). According to one embodiment of the present invention, the first clock generation circuit (clock generation circuit 1) (85a) and the second clock generation circuit (clock generation circuit 2) (85b) may, in practical applications, be implemented using oscillators, clock generators, crystal circuits, or any other circuit modules or devices capable of achieving the same functionality.

Please refer to FIG. 2A. According to one embodiment of the present invention, the first switch (switch 1) (109) is integrated into the first device-side I/O device interconnect controller (device-side I/O device interconnect controller 1) (107), while the second switch (switch 2) (209) is integrated into the second device-side I/O device interconnect controller (device-side I/O device interconnect controller 2) (207). Therefore, the first SVC (SVC 1) (10) and the second SVC (SVC 2) (20) are respectively coupled to the first PSD (PSD 1) (9a) and the second PSD (PSD 2) (9b) of the plurality of PSDs (9) via the first device-side I/O device interconnect controller (device-side I/O device interconnect controller 1) (107) which includes the first switch (switch 1) (109) and the second device-side I/O device interconnect controller (device-side I/O device interconnect controller 2) (207) which includes the second switch (switch 2) (209).

Please refer to FIG. 2B. According to another embodiment of the present invention, the first switch (switch 1) (109) and the second switch (switch 2) (209) are respectively included within the first SVC (SVC 1) (10) and the second SVC (SVC 2) (20), and the first switch (switch 1) (109) and the second switch (switch 2) (209) are respectively separated from and operate independently of the first device-side I/O device interconnect controller (device-side I/O device interconnect controller 1) (107) and the second device-side I/O device interconnect controller (device-side I/O device interconnect controller 2) (207).

According to another embodiment of the present invention, the first switch (switch 1) (109) and the second switch (switch 2) (209) are independent circuitries. In another embodiment of the present invention, the first switch (switch 1) (109) and the second switch (switch 2) (209) are further integrated into a single switch. According to one embodiment of the present invention, the first switch (switch 1) (109) and the second switch (switch 2) (209) are mounted on the backplane (401). Furthermore, in practical applications, the first switch (switch 1) (109) and the second switch (switch 2) (209) are PCIe switches according to one embodiment of the present invention. The first SVC (SVC 1) (10) and the second SVC (SVC 2) (20) need to be coupled to the first PSD (PSD 1) (9a) and the second PSD (PSD 2) (9b) of the plurality of PSDs (9) via the first switch (switch 1) (109) and the second switch (switch 2) (209).

Figure 2C:
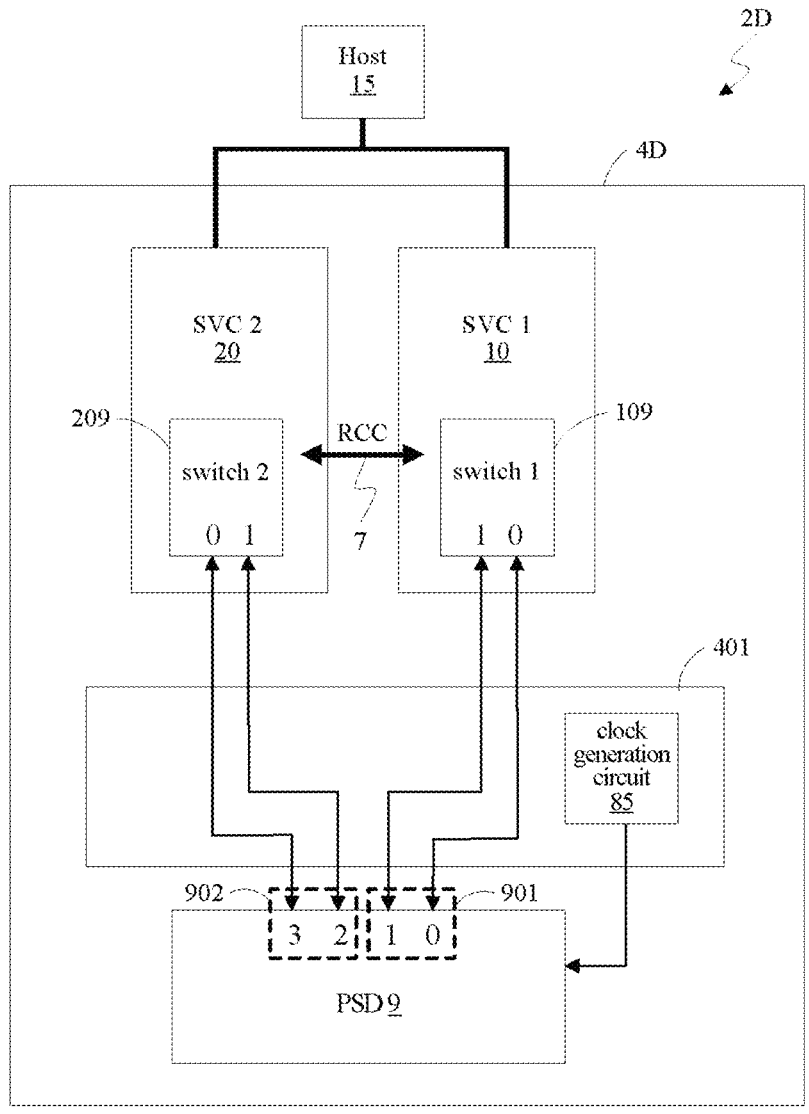
FIG. 2C and FIG. 2D illustrate, based on the storage system architecture (2D) of the present invention, the changes in the configuration values of multiple lanes of a single-port before and after the primary controller for the physical storage device (PSD) (9) is switched.

Please refer to FIG. 2A, FIG. 2B, and FIG. 2C, wherein FIG. 2C is a functional block diagram illustrating a storage system architecture (2D) and demonstrates how a single-port PSD (9) is coupled to the two SVCs (SVC 1 and SVC 2) (10, 20) via the switches (109, 209) according to one embodiment of the present invention. FIG. 2C depicts the storage system architecture (2D) shown in FIG. 2A and FIG. 2B in another way. In order to emphasize this coupling method and facilitate understanding, only one single-port PSD (9) (e.g., PSD 1 (9a)) is shown in FIG. 2C to explain how the PSD (9) utilizes its single port to be coupled to the two SVCs (SVC 1 (10) and SVC 2 (20)). In one embodiment of the present invention, it is assumed that the single port of the PSD (9) comprises multiple PCIe lanes, with the total number being an even number. These PCIe lanes can be further divided into two half portions (901, 902), each of which comprises a half of the total number of the lanes. Specifically, the lanes of the first half (half portion 1) (901) are coupled to the first SVC (SVC 1) (10) via the first switch (switch 1) (109), while the lanes of the second half (half portion 2) (902) are coupled to the second SVC (SVC 2) (20) via the second switch (switch 2) (209). In other words, the lanes that the first SVC (SVC 1) (10) and the second SVC (SVC 2) (20) can respectively manage and utilize correspond exactly to the half of the multiple PCIe lanes of the single port of the PSD (9).

Assuming that at system initialization, the first SVC (SVC 1) (10) is configured as a primary controller for the PSD (9) (e.g., PSD 1 (9a)), and the second SVC (SVC 2) (20) is configured as the secondary controller for the same PSD (9) (e.g., PSD 1 (9a)). Based on this assumption, when a single-port PSD (9) (e.g., PSD 1 (9a)) is coupled to the RAID subsystem (4D), the second SVC (SVC 2) (20) disables, via the switch 2 (209), the lanes newly coupled thereto. These disabled lanes correspond to the second half (half portion 2) (902) of the single port of the PSD (9) (e.g., PSD 1 (9a)). Meanwhile, the first SVC (SVC 1) (10) initiates a procedure to enable its newly coupled lanes, which correspond to the first half (half portion 1) (901) of the single port of the PSD (9) (e.g., PSD 1 (9a)). The first SVC (SVC 1) (10) first sequences, via the switch 1 (109), the newly coupled lanes, which correspond to the first half (half portion 1) (901) of the single port of the PSD (9) (e.g., PSD 1 (9a)). In one embodiment of the present invention, the sequencing method involves the first SVC (SVC 1) (10) sequentially configuring the parameter values of respective lanes via the first switch (switch 1) (109). According to the embodiment illustrated in FIG. 2C, where the single port of the PSD (9) (e.g., PSD 1 (9a)) has four PCIe lanes, the first SVC (SVC 1) (10) configures its two coupled lanes as lane "0" and lane "1". Consequently, the two lanes within the first half (half portion 1) (901) of the single port of the PSD (9) (e.g., PSD 1 (9a)) that are coupled to the SVC 1 (10) also are correspondingly regarded as lane "0" and lane "1". Therefore, the four PCIe lanes of the single port of the PSD (9) (e.g., PSD 1 (9a)), including the two lanes of the first half (half portion 1) (901) and the two lanes of the second half (half portion 2) (902), are sequentially mapped as lane "0", lane "1", lane "2", and lane "3". After such configuration, the first SVC (SVC 1) (10) enables, via the switch 1 (109), its two lanes corresponding to lane 0 and lane 1 of the first half (half portion 1) (901) of the single port of the PSD (9), and accesses the data stored in the PSD (9) (e.g., PSD 1 (9a)) through the two enabled lanes (i.e., lane 0 and lane 1 corresponding to the first half (half portion 1) (901)).

Figure 2D:
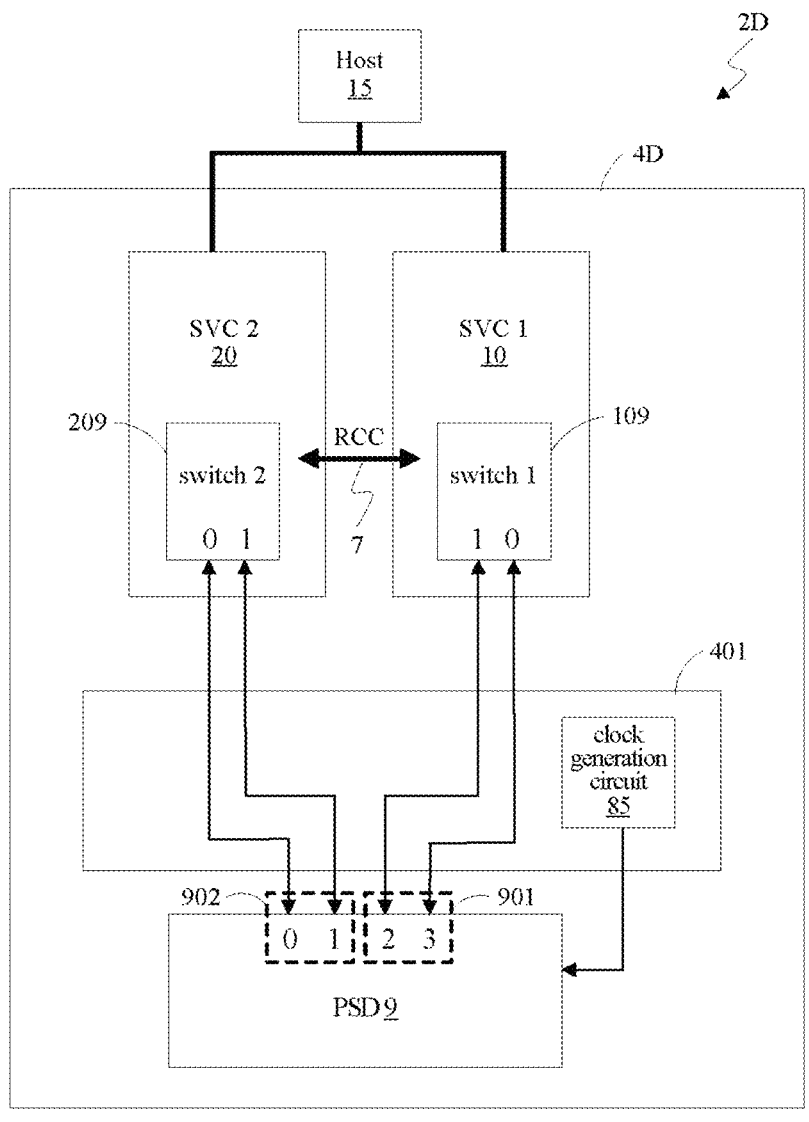

Please refer to FIG. 2D, which is a functional block diagram of the storage system architecture (2D) according to one embodiment of the present invention. This figure illustrates changes in the configuration values of the lanes of the single port of the PSD (9) when the user of the PSD (9) needs to be switched from the first SVC (SVC 1) (10) to the second SVC (SVC 2) (20). The reasons for needing to switch the user of the PSD (9) may include, for example: a failure or malfunction of the first SVC (SVC 1) (10) as shown in FIG. 2C, or a planned transfer of ownership of the PSD (9) to the second SVC (SVC 2) (20) even while the first SVC (SVC 1) (10) is still functioning normally. During the switching process, the second SVC (SVC 2) (20) takes over the tasks of the first SVC (SVC 1) (10), including assuming the role of the primary controller for the PSD (9) (e.g., PSD 1 (9a)). At this point, the second SVC (SVC 2) (20) performs a sequencing operation for its lanes via the second switch (switch 2) (209), where the lanes correspond to the multiple PCIe lanes of the second half (half portion 2) (902) of the single port of the PSD (9) (e.g., PSD 1 (9a)). According to one embodiment of the present invention, the sequencing operation performed by the second SVC (SVC 2) (20) is to configure sequentially, through the switch 2 (209), each lane from the first among the multiple lanes (corresponding to the PCIe lanes of the second half (half portion 2) (902) of the single port of the PSD (9)). In other words, the second SVC (SVC 2) (20) sequentially sets the configuration values for each of the multiple lanes that are coupled and corresponding to the PCIe lanes of the second half (half portion 2) (902) of the single port of the PSD (9). According to the embodiment shown in FIG. 2D, if the single port of the PSD (9) (e.g., PSD 1 (9a)) has four PCIe lanes, the second SVC (SVC 2) (20) sets its two lanes coupled to the PSD (9) (e.g., PSD 1 (9a)), as lane "0" and lane "1". Consequently, the two lanes of the second half (half portion 2) (902) of the single port of the PSD (9) (e.g., PSD 1 (9a)) that are coupled to the second SVC (SVC 2) (20) are correspondingly regarded as lane "0" and lane "1". Thus, the four PCIe lanes of the single port of the PSD (9) (e.g., PSD 1 (9a)), including the two lanes in the first half (half portion 1) (901) and the two lanes in the second half (half portion 2) (902), are sequentially mapped as lane "3", lane "2", lane "1", and lane "0". After such configuration, the second SVC (SVC 2) (20) utilizes its two coupled lanes (corresponding to lane "0" and lane "1" of the second half (half portion 2) (902) of the single port of the PSD (9)) via the switch 2 (209), and accesses data stored in the PSD (9) through its own two lanes corresponding to lane "0" and lane "1" of the second half (half portion 2) (902).

As for how the system initially determines which of the two SVCs (10, 20) serves as the primary controller and which serves as the secondary controller, it will be explained in detail in the following description of FIG. 4.

Please refer to FIG. 2A together with FIG. 2C. According to one embodiment of the present invention, it is assumed that the first SVC (SVC 1) (10) serves as the primary controller, while the second SVC (SVC 2) (20) serves as the secondary controller. When the PSDs (9a, 9b) are installed in the RAID subsystem (4A), the first clock generation circuit (clock generation circuit 1) (85a) provides a dedicated first clock signal to the first PSD (PSD 1) (9a), and the second clock generation circuit (clock generation circuit 2) (85b) provides a dedicated second clock signal to the second PSD (PSD 2) (9b). In this manner, the first PSD (PSD 1) (9a) and the second PSD (PSD 2) (9b) can operate normally based on their respective first clock signal and second clock signal. Furthermore, once the primary controller (specifically, the first device-side I/O device interconnect controller (107) of the first SVC (10)) identifies, via the first switch (switch 1) (109), which PSDs (9) (i.e., PSD 1 (9a) and PSD 2 (9b)) are coupled to it, the primary controller sends a reset signal to the first switch (switch 1) (109) to request a reset of the coupled PSDs (9a, 9b). Subsequently, the primary controller (i.e., SVC 1 (10)) proceeds, via the first switch (switch 1) (109), to verify, sequence, and enable the lanes corresponding to the first half (half portion 1) (901) of the single port of each coupled PSD (9), such as PSD 1 (9a) and PSD 2 (9b). Taking FIG. 2C as an example, suppose the PSDs (9) (e.g., PSD 1 (9a) and PSD 2 (9b)) each has four PCIe lanes, the primary controller (i.e., SVC 1 (10)) sequences the PCIe lanes coupled thereto. That is to say, the primary controller (i.e., SVC 1 (10)) configures the coupled lanes (corresponding to the two lanes of the first half (half portion 1) (901)) as lane "0" and lane "1". Consequently, the four PCIe lanes of the single port of each PSD (9) (e.g., PSD

1 (9a) and PSD 2 (9b)), which include two lanes from the first half (half portion 1) (901) and two lanes from the second half (half portion 2) (902), are sequentially mapped as lane "0", lane "1", lane "2", and lane "3". Then, the primary controller (i.e., the SVC 1 (10)) enables its lanes corresponding to the two lanes (lane "0" and lane "1") of the first half (half portion 1) (901). Meanwhile, the secondary controller (specifically, the second device-side I/O device interconnect controller (207) of the second SVC (20)) verifies and disables, via the switch 2 (209), the lanes coupled thereto. These disabled lanes correspond to the lanes of the second half (half portion 2) (902) of the single port of the PSD (9) (e.g., PSD 1 (9a) and PSD 2 (9b)). Through this configuration, the primary controller (i.e., SVC 1 (10)) can respectively access the data stored in the first (PSD 1) (9a) and the second PSD (PSD 2) (9b) through the enabled lanes, which correspond to the lanes of the first half (half portions 1) (901) of the single port of the PSD 1 (9a) and the PSD 2 (9b), via the switch 1 (109).

Please note that according to the technology of the present invention, since the PSDs (9a, 9b) are respectively equipped with dedicated and independently operating clock generation circuits (85a, 85b), the PSDs (9a, 9b) do not rely on the SVCs (10, 20) or the switches (109, 209) to provide the clock signals required for operation. Even if the primary controller (SVC 1 (10)) fails and becomes unable to provide services, the PSDs (9a, 9b) can still maintain normal operation by their dedicated clock signals continuously generated from their respective dedicated clock generation circuits (85a, 85b), maintaining the system performance without causing any delays.

Figure 3:
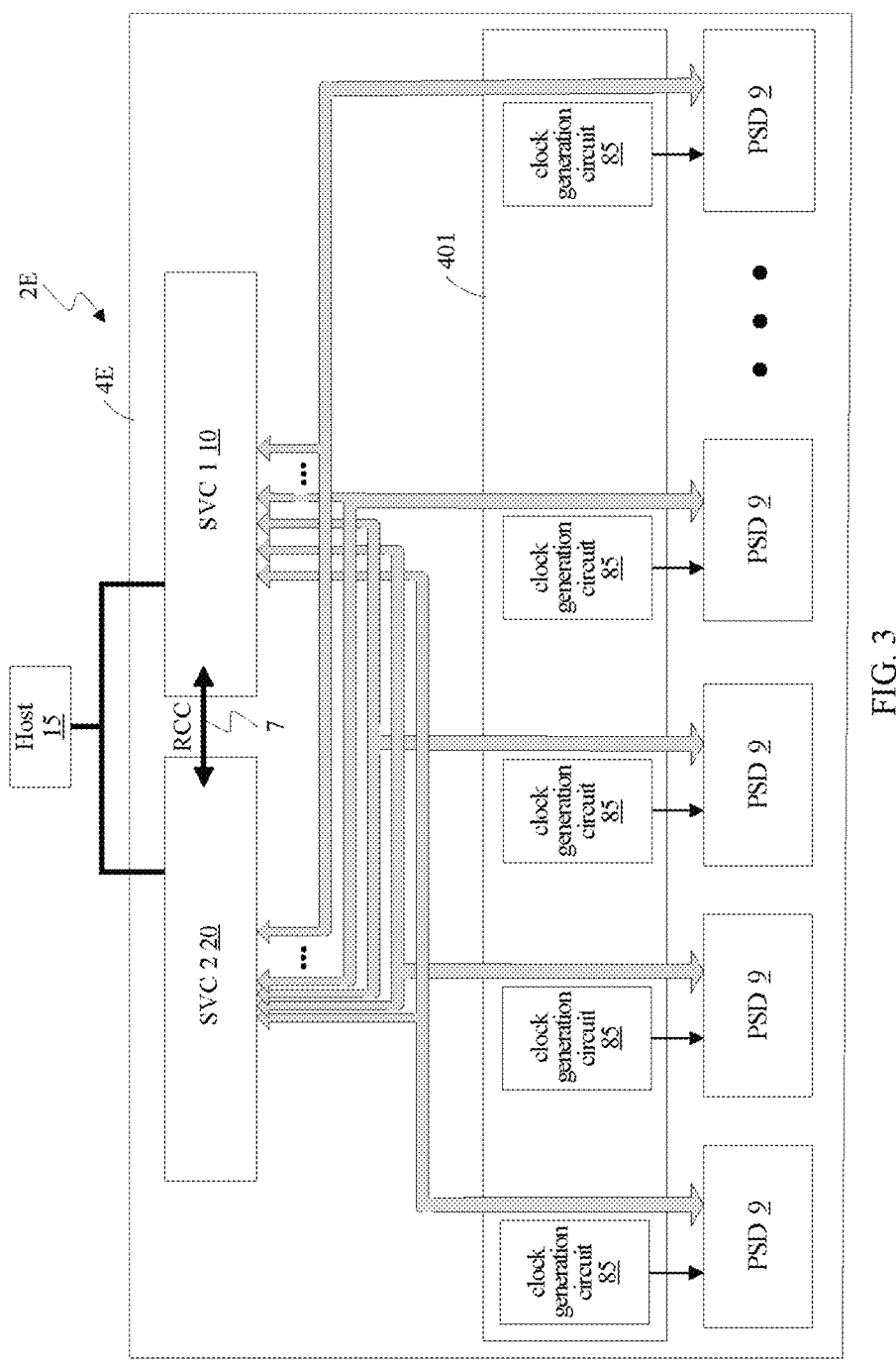
FIG. 3 is a block diagram illustrating a storage system architecture (2F) according to the present invention.

Please refer to FIG. 3, which is a block diagram illustrating the storage system architecture (2E) according to one embodiment of the present invention. The storage system architecture (2E) comprises a host (15) and a redundant array of independent disks subsystem (4E) (also referred to as "RAID subsystem (4E)"). The RAID subsystem (4E) includes a storage virtualization controller pair (SVC pair) comprising a first SVC (SVC 1) (10) and a second SVC (SVC 2) (20), a plurality of PSDs (9), a plurality of clock generation circuits (85), and a backplane (401). The clock generation circuits (85) are mounted on the backplane (401) and are individually coupled to the plurality of PSDs (9) in a one-to-one manner.

According to one embodiment of the present invention, the plurality of clock generation circuits (85a, 85b) are components directly mounted on the backplane (401). According to another embodiment of the present invention, the backplane (401) further includes a plurality of sockets, each socket configured to accommodate one of the plurality of clock generation circuits (85) in a one-to-one manner, thereby facilitating convenient replacement of the clock generation circuits (85) as needed. According to another embodiment of the present invention, the backplane (401) includes a plurality of sockets, each of which individually accommodates a corresponding interposer in a one-to-one manner. The multiple interposers are respectively equipped with one of the clock generation circuits (85), each of which provides a dedicated clock signal to the PSD (9) coupled to the corresponding interposer. The plurality of PSDs (9) are respectively coupled to the corresponding interposers, through which the PSDs (9) are further coupled to the first SVC (SVC 1) (10) and the second SVC (SVC 2) (20). This design enables selective removal and replacement of one or more of the interposers, allowing for convenient replacement of the clock generation circuit (85) mounted on the interposer. In another embodiment of the present invention, the plurality of clock generation circuits (85) are mounted in a one-to-one manner on the plurality of interposers. Each of the multiple interposers includes a slot to accommodate the corresponding one of the plurality of PSDs (9) and facilitates the coupling of the connected PSDs (9) to the first SVC (SVC 1) (10) and the second SVC (SVC 2) (20). As such, one or more interposers can be removed as needed, making it convenient to replace the clock generation circuit (85) mounted on the interposer.

The configuration and interconnection relationships of the individual components within the first SVC (SVC 1) (10) and the second SVC (SVC 2) (20) have been described in the previous paragraphs. Please refer to the relevant descriptions of FIG. 2A for details. The two SVCs (10, 20) in the SVC pair are respectively coupled to the multiple PSDs (9) via their respective connected first switch (switch 1) (109) and second switch (switch 2) (209). In practical applications, the first switch (switch 1) (109) and the second switch (switch 2) (209) can be PCIe switches or other types of switches capable of achieving the same functionality. The first switch (switch 1) (109) and the second switch (switch 2) (209) may be implemented as independent components respectively included in the first SVC (SVC 1) (10) and the second SVC (SVC 2) (20), or alternatively, may be implemented as independent components located on the backplane (401). In other embodiment of the present invention, the first switch (switch 1) (109) and the second switch (switch 2) (209) are respectively integrated into the first CPC (CPC 1) (103) of the first SVC (SVC 1) (10) and the second CPC (CPC 2) (203) of the second SVC (SVC 2) (20). In further embodiment of the present invention, the first switch (switch 1) (109) and the second switch (switch 2) (209) are respectively integrated into the first device-side I/O device interconnect controller (device-side I/O device interconnect controller 1) (107) of the first SVC (SVC 1) (10) and the second device-side I/O device interconnect controller (device-side I/O device interconnect controller 2) (207) of the second SVC (SVC 2) (20).

The first SVC (SVC 1) (10) and the second SVC (SVC 2) (20) included in the RAID subsystem (4E) have an architecture and functionality that are substantially the same as those of the first SVC (SVC 1) (10) and the second SVC (SVC 2) (20) included in the RAID subsystem (4D) described in FIG. 2A and FIG. 2B. Therefore, the related details of the first SVC (SVC 1) (10) and the second SVC (SVC 2) (20) in the RAID subsystem (4E) depicted in FIG. 3 will not be repeated here.

According to one embodiment of the present invention, the PSDs (9) may be physical storage media capable of permanently storing data, such as hard disk drives (HDDs), solid-state drives (SSDs), or optical discs. According to another embodiment of the present invention, the PSDs (9) may be volatile memory, such as random access memory (RAM), dynamic random access memory (DRAM), or flash memory, or other physical storage devices capable of providing similar functionality.

According to one embodiment of the present invention, it is assumed that the first SVC (SVC 1) (10) serves as the primary controller for all PSDs (9), while the second SVC (SVC 2) (20) serves as the secondary controller for all PSDs (9). During operation, the primary controller (i.e., SVC 1 (10)) determines, via the first switch (switch 1) (109), the PSDs (9) to which it is coupled. When the PSDs (9) are installed in the RAID subsystem (4E), each of the PSDs (9) is coupled to a dedicated clock generation circuit (85) and receives a dedicated clock signal from its corresponding clock generation circuit (85). This ensures that each of the PSDs (9) can operate properly based on its dedicated clock signal. Additionally, the secondary controller (specifically, the second device-side I/O device interconnect controller (207) of the second SVC (20)) verifies and disables, via the second switch (switch 2) (209), its lanes coupled to the PSDs (9). These lanes correspond to the lanes in the second half (half portion 2) (902) of the single port of each PSD (9). The primary controller (specifically, the first device-side I/O device interconnect controller (107) of the first SVC (10)) sends a reset signal to the PSDs (9) via the first switch (switch 1) (109), requesting the PSDs (9) to reset the multiple lanes of its single ports. Subsequently, the primary controller (i.e., SVC 1 (10)) proceeds, via the first switch (switch 1) (109), to enable, verify, and sequence its lanes coupled to the PSDs (9). These lanes correspond to the lanes of the first half (half portions 1) (901) of the single port of each PSD (9) that are coupled to the primary controller. For example, referring also to FIG. 2C, assume that the single port of each PSD (9) has four PCIe lanes, the primary controller (i.e., SVC 1 (10)) enables and sequences its lanes first, and consequently, the two lanes (corresponding to the enabled lanes) of the first half (half portion 1) (901) of the single port of the corresponding PSD (9) are configured as lane "0" and lane "1". At this point, the four PCIe lanes of the single port of the PSD (9), comprising two lanes in the first half (half portion 1) (901) and two lanes in the second half (half portion 2) (902), are correspondingly and sequentially mapped as lane "0", lane "1", lane "2", and lane "3". With this configuration, the primary controller (SVC 1) can access data from multiple PSDs (9) via the first switch (switch 1) (109), through its lanes corresponding to the ones in the first half (half portion 1) (901) of the single port of the PSD (9). From this, it can be understood that in the present invention, one half of the lanes of the single port of the PSD (9) is coupled to the first SVC (SVC 1) (10) via the first switch (switch 1) (109), while the other half of the lanes of the single port is coupled to the second SVC (SVC 2) (20) via the second switch (switch 2) (209). In other words, the first SVC (SVC 1) (10) and the second SVC (SVC 2) (20) each manage and utilize lanes that respectively correspond to one half of the four PCIe lanes of the single port of each PSD (9).

Please note that the clock generation circuit (85) disclosed in the present invention is an independently operating circuit component. Therefore, even if the primary controller fails and become unable to provide service, the PSDs (9) can still receive their dedicated clock signals from the dedicated clock generation circuits (85), to which they are coupled. As a result, the PSDs (9) can continue operating without interruption, thereby maintaining system performance and avoiding operational latency. In this way, the first issue found in the prior art is resolved, where a PSD (9) have to suspend its ongoing process due to the lack of a clock signal during the transitional period between the failure of the primary controller and the takeover by the secondary controller.

Figure 1A:
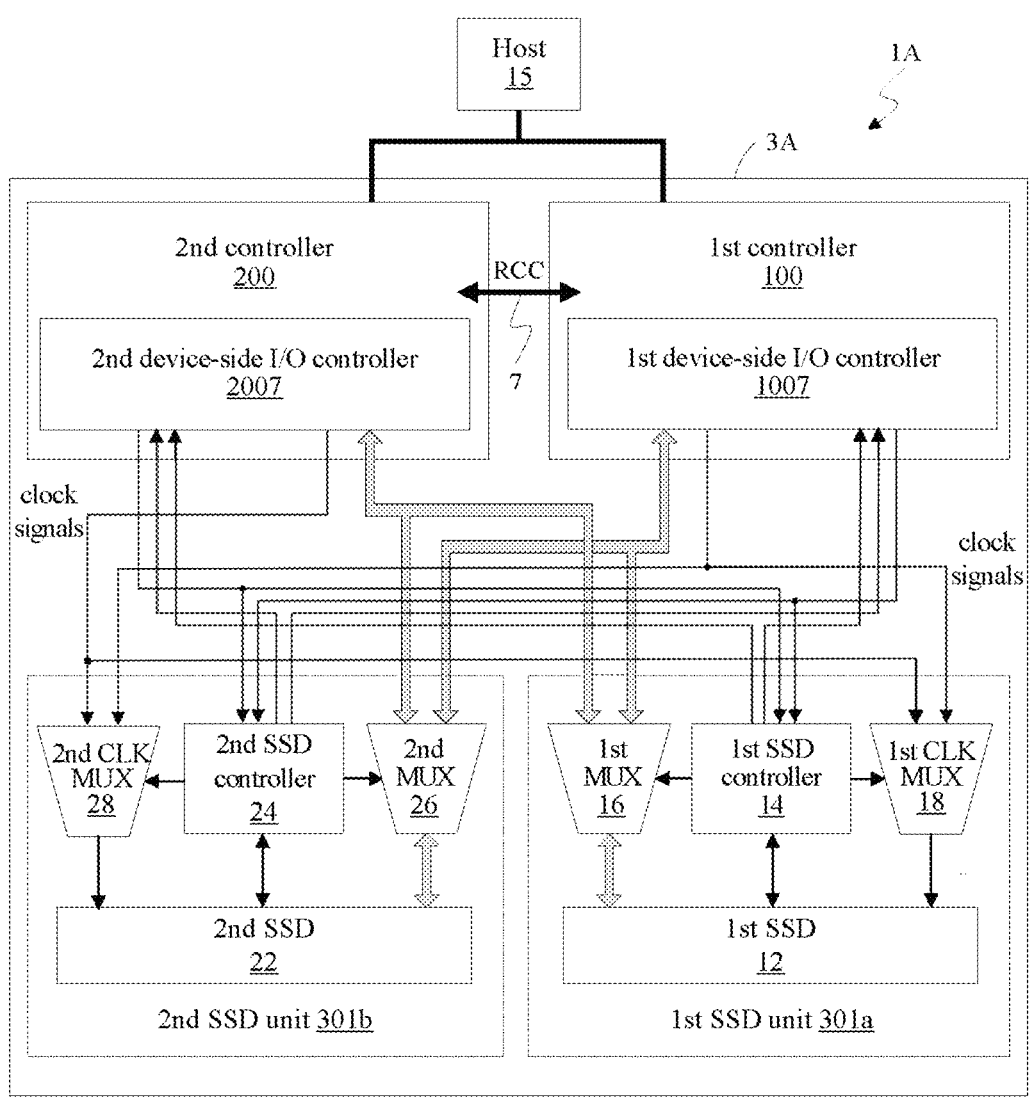
FIG. 1A illustrates a block diagram of a conventional storage system architecture (1A).
Figure 1B:
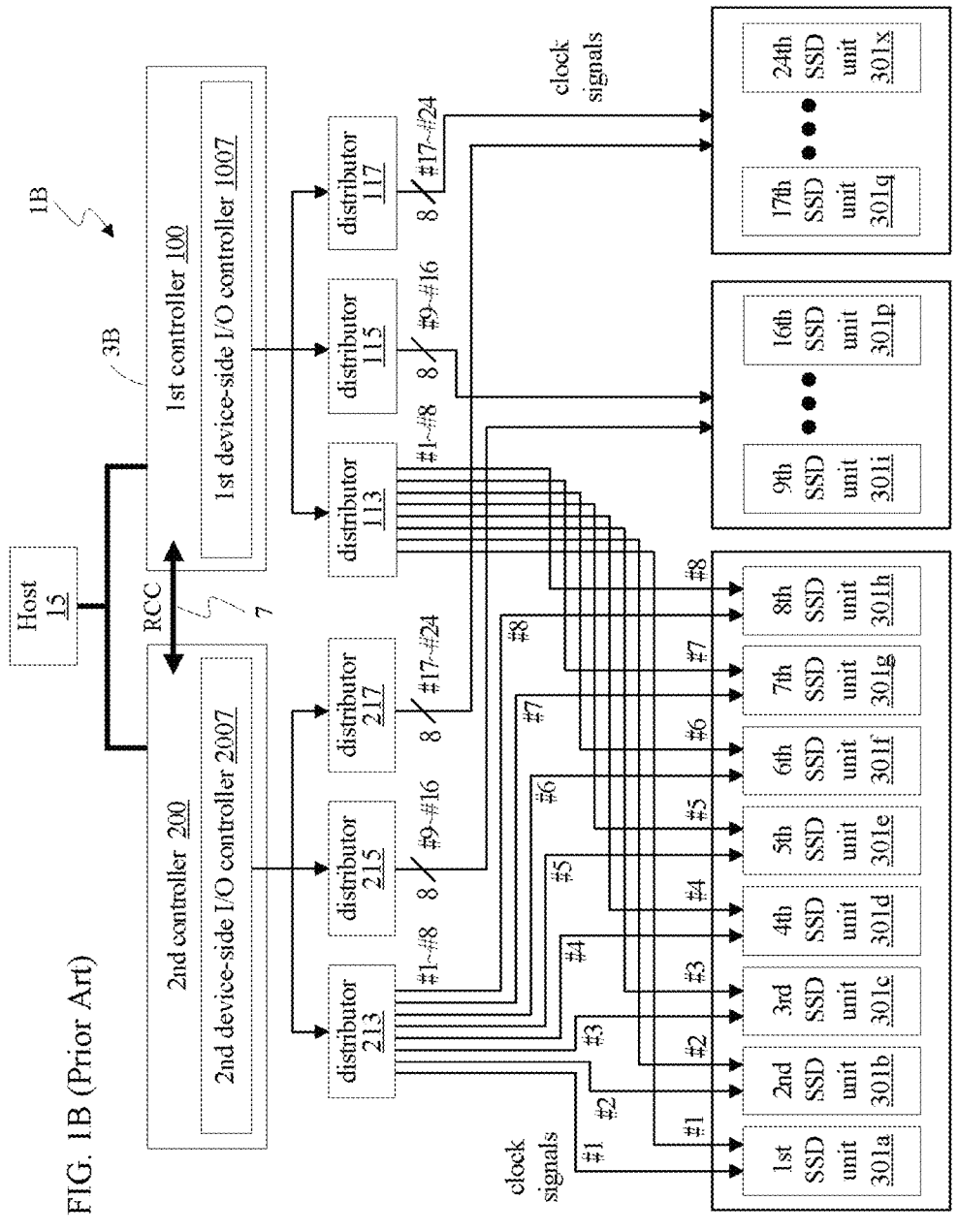
FIG. 1B illustrates a block diagram of another conventional storage system architecture (1B).

Furthermore, according to the present invention, each one of the PSDs (9) is directly coupled to one of the dedicated clock generation circuits (85), which directly provide the dedicated clock signals to their corresponding PSDs (9). As a result, when the storage system architecture (2E) is coupled to a larger number of PSDs (9), there is no longer a need for additional circuit components (such as the distributors (113, 115, 117) in FIG. 1B) to assist the SVCs (10, 20) in routing clock signals to the multiple PSDs (9). This design thus resolves the second issue found in the prior art, where the failure of a distributor causes all the connected PSDs (9) to malfunction, resulting in degraded system performance.

Moreover, since the storage system architecture (2E) does not require additional circuit components (e.g., distributors 113, 115, 117, 213, 215, 217), it saves component costs, thereby avoiding the third issue of increased costs found in the prior art. Additionally, because the storage system architecture (2E) does not require extra circuit components (e.g., distributors 113, 115, 117, 213, 215, 217), its circuitry is significantly simpler, eliminating complex routing. This resolves the fourth issue of complex routing in the prior art.

Figure 4:
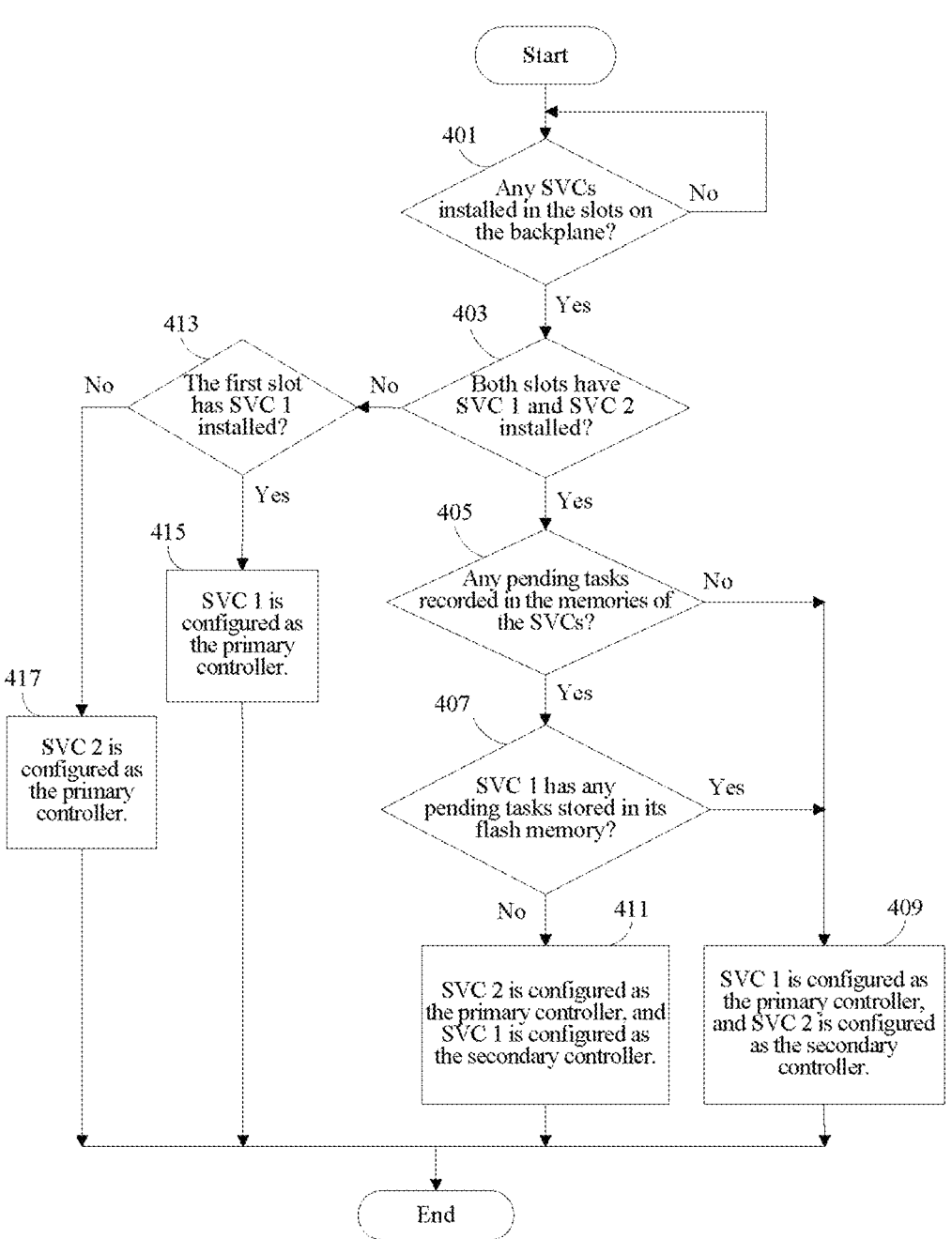
FIG. 4 is a flowchart regarding the process of configuring an SVC as the primary controller according to one embodiment of the present invention.

Please refer to FIG. 4, which illustrates a flowchart regarding the setup process of the primary controller according to one embodiment of the present invention. While the following explanation takes the storage system architecture (2D) as an example, the technical content is equally applicable to other storage system architecture (such as 2E) disclosed in the present invention. According to one embodiment of the present invention, the backplane (401) of the storage system architecture (2D) comprises a first slot and a second slot for installing the first SVC (SVC 1) (10) and the second SVC (SVC 2) (20). These slots facilitate electrical connections between the SVCs (10, 20) and other components connected to the backplane (401). When the RAID subsystem (4D, 4E) is established, the SVCs (10, 20) are first inserted into the slots on the backplane (401). After all components are in place and connections are completed, the RAID subsystem (4D, 4E) is then activated to initiate the configuration of the primary controller. At this point, the RAID subsystem (4D, 4E) determines whether there are any SVCs installed in the slots (the first slot and the second slot) on the backplane (step 401). If the determination result in step 401 is "No", indicating that no SVC is installed in any of the slots on the backplane (401), then the RAID subsystem (4D, 4E) remains in or continues to wait in step 401. If the determination result in step 401 is "Yes", indicating that one or more SVCs are installed in the slots on the backplane (401), the process flow proceeds to step 403 to continue with the configuration of the primary controller.

If the determination result in step 401 is "Yes", then the RAID subsystem (4D, 4E) will further determine whether both slots (i.e., the first slot and the second slot) have the SVCs (10, 20) installed (step 403). If the determination result in step 403 is "Yes", indicating that both the first slot and the second slot have the SVCs (10, 20) installed, then the process proceeds to step 405 for further determination to assist in deciding which SVC (either the first SVC (SVC 1) (10) or the second SVC (SVC 2) (20)) should serve as the primary controller. Conversely, if the determination result in step 403 is "No", indicating that only one of the slots has an SVC installed, then the process proceeds to step 413 to determine which one of the slots has an SVC installed, and the installed SVC (either the first SVC (SVC 1) (10) or the second SVC (SVC 2) (20)) will be configured as the primary controller.

If the determination result in step 403 is "Yes", the process proceeds to step 405, where the two SVCs (10, 20) determine whether there are any pending tasks recorded in their respective flash memories (step 405). If the determination result in step 405 is "No", indicating that neither of the SVCs (10, 20) has any pending tasks recorded in their respective flash memories, then according to the default settings, the RAID subsystem (4D, 4E) configures the SVC installed in the first slot (i.e., SVC 1 (10)) as the primary controller, and configures the SVC (i.e., SVC 2 (20)) installed in the second slot as the secondary controller (step

409). On the contrary, if the determination result in step 405 is "Yes", indicating that at least one of the SVCs (10, 20) has pending tasks recorded in its flash memory, then the process proceeds to step 407 for further determination.

In step 407, a further determination is made to check whether the first SVC (SVC 1) (10) installed in the first slot has any pending tasks recorded in its flash memory. If the determination result in step 407 is "Yes", then the first SVC (SVC 1) (10) installed in the first slot is configured as the primary controller, while the second SVC (SVC 2) (20) installed in the second slot is configured as the secondary controller (step 409). If the determination result in step 407 is "No", it indicates that the flash memory with pending tasks is associated with the second SVC (SVC 2) (20). In this case, the second SVC (SVC 2) (20) installed in the second slot is configured as the primary controller, while the first SVC (SVC 1) (10) installed in the first slot is configured as the secondary controller (step 411).

Returning to the other outcome of step 403: If the determination result in step 403 is "No", the process proceeds to step 413, where the RAID subsystem (4D, 4E) further determines whether the first slot has the first SVC (SVC 1) (10) installed (step 413). If the determination result in step 413 is "Yes", indicating that only the first SVC (SVC 1) (10) is installed in the first slot, then the first SVC (SVC 1) (10) naturally assumes the role of the primary controller (step 415). On the contrary, if the determination result in step 413 is "No", indicating that only the second SVC (SVC 2) (20) is installed in the second slot and there is no SVC installed in the first slot, then the second SVC (SVC 2) (20) installed in the second slot is configured as the primary controller (step 417).

Please refer to FIG. 5 which illustrates a flowchart regarding the process of configuring a user for a PSD according to one embodiment of the present invention. The following explanation takes the RAID subsystem (4D) of the storage system architecture (2D) in FIG. 2A as an example, and assumes that the first SVC (SVC 1) (10) serve as the primary controller for the first PSD (PSD 1) (9a), while the second SVC (SVC 2) (20) serve as the secondary controller for the first PSD (PSD 1) (9a). Similarly, the technical content illustrated in FIG. 5 is also applicable to other storage system architectures (such as 2E) in the present invention. According to one embodiment of the present invention, in the RAID subsystem (4D, 4E), the first SVC (SVC 1) (10) (i.e., the primary controller) detects, via the switch 1 (109), whether there is any PSD (9) coupled that has not yet been assigned to a user (step 501).

If the determination result in step 501 is "No", indicating that the first SVC (SVC 1) (10) does not detect any coupled PSD (9) that is not assigned to a user via the first switch (switch 1) (109), then the first SVC (SVC 1) (10) of the RAID subsystem (4D) continues executing the aforesaid operation in step 501 to ensure that each coupled PSD (9) has a user (SVC) configured (step 501).

If the determination result in step 501 is "Yes", indicating that an unassigned PSD (9) (e.g., PSD 1 (9a) in FIG. 2A) has been detected, then according to the descriptions in FIG. 4, it can be understood that the system configures, based on the default settings of the system, the first SVC (SVC 1) (10) as the primary controller of the PSD (9) (e.g., PSD 1 (9a)). In actual operation, the first SVC (SVC 1) (10) and the second SVC (SVC 2) (20) communicate with each other via the redundant controller communicating (RCC) interconnect (7) to determine which of them is the primary controller of the newly coupled PSD (9) (e.g., PSD 1 (9a)). Based on the aforementioned assumption, the determination result is that the first SVC (SVC 1) (10) is the primary controller of the newly coupled PSD (9) (e.g., PSD 1 (9*a*)), meaning that the first SVC (SVC 1) (10) is the user of the newly coupled PSD (9) (e.g., PSD 1 (9*a*)) (step 503). Consequently, the second SVC (SVC 2) (20) disables its newly coupled lanes via the second switch (switch 2) (209). These disabled lanes correspond to the lanes of the second half (half portion 2) (902) of the single port of the PSD (9) (e.g., PSD 1 (9*a*)), which are coupled to the second SVC (SVC 2) (step 505). Meanwhile, the first SVC (SVC 1) (10) enables its newly coupled lanes via the first switch (switch 1) (109). These enabled lanes correspond to the lanes of the first half (half portion 1) (901) of the single port of the PSD (9) (e.g., PSD 1 (9*a*)), which are coupled to the first SVC (SVC 1) (10) (step 507). Subsequently, the first SVC (SVC 1) (10) sends a reset signal to the newly coupled PSD (9) (e.g., PSD 1 (9*a*)) via the first switch (switch 1) (109) to ask the PSD (9) to configure itself (i.e., SVC 1 (10)) as the user of the PSD (9) (step 509).

According to one embodiment of the present invention, the detecting method performed by the first SVC (SVC 1) (10) in step 501, through the switch 1 (109), further includes: the first switch (switch 1) (109) detects whether an unassigned PSD (9) is coupled. If such an unassigned PSD (9) is detected, the first switch (switch 1) (109) notifies the first SVC (SVC 1) (10) (i.e., the primary controller), thereby allowing first SVC (SVC 1) (10) to recognize the presence of a newly coupled PSD (9) (e.g., PSD 1 (9*a*) in FIG. 2A).

Next, when the first SVC (SVC 1) (10) is successfully configured as the user of the newly coupled PSD (9) (e.g., PSD 1 (9*a*)) via the first switch (switch 1) (109), the first SVC (SVC 1) (10) verifies, via the first switch (switch 1) (109), the number and statuses of the enabled lanes, which correspond to the lanes of the first half (half portion 1) (901) of the single port of the PSD (9) (step 511). For example, after checking through the first switch (switch 1) (109), the first SVC (SVC 1) (10) determines that the enabled lanes correspond to two usable PCIe lanes of the PSD (9). In other words, the first SVC (SVC 1) (10) learns, through the first switch (switch 1) (109), that a newly coupled PSD (9) (e.g., PSD 1 (9*a*)) has its single port coupled to the first switch (switch 1) (109) and that two of PCIe lanes of the single port are available for use.

After the determination process in step 511 is completed, the first SVC (SVC 1) (10) sequences, through the first switch (switch 1) (109), the enabled lanes, which correspond to the lanes of the first half (half portion 1) (901) of the single port of the PSD (9) (step 513). Taking FIG. 2C as an example, the first SVC (SVC 1) (10) (the primary controller) configures its enabled lanes (corresponding to the two lanes of the first half (half portion 1) (901)) as lane "0" and lane "1". Therefore, the four PCIe lanes of the single port of the PSD (9) (e.g., PSD 1 (9*a*)), including two lanes from the first half (half portion 1) (901) and two lanes from the second half (half portion 2) (902), are sequentially mapped as lane "0", lane "1", lane "2", and lane "3".

After the sequence process in step 513 is completed, the first SVC (SVC 1) (10) can then use the enabled lanes corresponding to the two lanes of the first half (half portion 1) (901) of the single port of the PSD (9) (namely, lane "0" and lane "1") via the switch 1 (109) (step 515). In this way, the user setup process for the PSD (9) is completed. Thereafter, when the first SVC (SVC 1) (10) sends a first I/O request to the PSD (9) (e.g., PSD 1 (9*a*)), the PSD (9) (e.g., PSD 1 (9*a*)) receives the first I/O request via the lanes of the first half (half portion 1) (901) of its single port and processes the first I/O request based on the dedicated clock signal provided by its dedicated clock generation circuit (85) (e.g., the first clock generation circuit (clock generation circuit 1) (85*a*)).

According to one embodiment of the present invention, although the foregoing description assumes that in FIGS. 2A, 2B, 2C, 2D, and 3, the primary controller of the PSD (9) (e.g., PSD 1 (9*a*)) is the first SVC (SVC 1) (10) and the secondary controller is the second SVC (SVC 2) (20), the primary and secondary controllers of the second PSD (PSD 2) (9*b*) do not necessarily have to be configured the same way as those of the first PSD (PSD 1) (9*a*). The second PSD (PSD 2) (9*b*) may be configured, as needed, with the second SVC (SVC 2) (20) serving as its primary controller and the first SVC (SVC 1) (10) serving as its secondary controller. Moreover, the operational behavior of the first SVC (SVC 1) (10) and the second (SVC 2) (20) with respect to the second PSD (PSD 2) (9*b*) is essentially the same as the operation of the two SVCs (SVC 1, SVC 2) (10, 20) with respect to the first PSD (PSD 1) (9*a*) as described in FIG. 5. Therefore, the relevant details will not be repeated here.

Please refer to FIG. 6, which illustrates a flowchart regarding the operation of the PSD (9) under the normal operating mode of the primary controller, according to one embodiment of the present invention. The following descriptions take the RAID subsystem (4D) in the storage system architecture (2D) shown in FIG. 2A as an example, assuming that the first SVC (SVC 1) (10) serves as the primary controller of the first PSD (PSD 1) (9*a*), and the second SVC (SVC 2) (20) serves as the secondary controller of the same first PSD (PSD 1) (9*a*). Similarly, the technical content illustrated in FIG. 6 is also applicable to other storage system architecture (2E) described in the present invention. According to one embodiment of the present invention, the PSD (9) (e.g., PSD 1 (9*a*)) is directly coupled to the dedicated first clock generation circuit (clock generation circuit 1) (85*a*) and is coupled to the SVC pair of the RAID subsystem (4D) via the first switch (switch 1) (109), wherein the SVC pair comprises the first SVC (SVC 1) (10) (i.e., the primary controller) and the second SVC (SVC 2) (20) (i.e., the secondary controller). Once the PSD (9) (e.g., PSD 1 (9*a*)) is coupled to the RAID subsystem (4D), the dedicated clock generation circuit (85) (e.g., clock generation circuit 1 (85*a*)) coupled thereto, provides a dedicated clock signal (e.g., the first clock signal) to the PSD (9) (e.g., PSD 1 (9*a*)) (step 601). The PSD (9) (e.g., PSD 1 (9*a*)) receives this dedicated clock signal (e.g., the first clock signal) (step 603). Upon receiving one or more I/O requests from the primary controller (i.e., SVC 1 (10)), the PSD (9) (e.g., PSD 1 (9*a*)) processes the one or more I/O requests based on the dedicated clock signal (e.g., the first clock signal) (step 605).

Figure 7A:
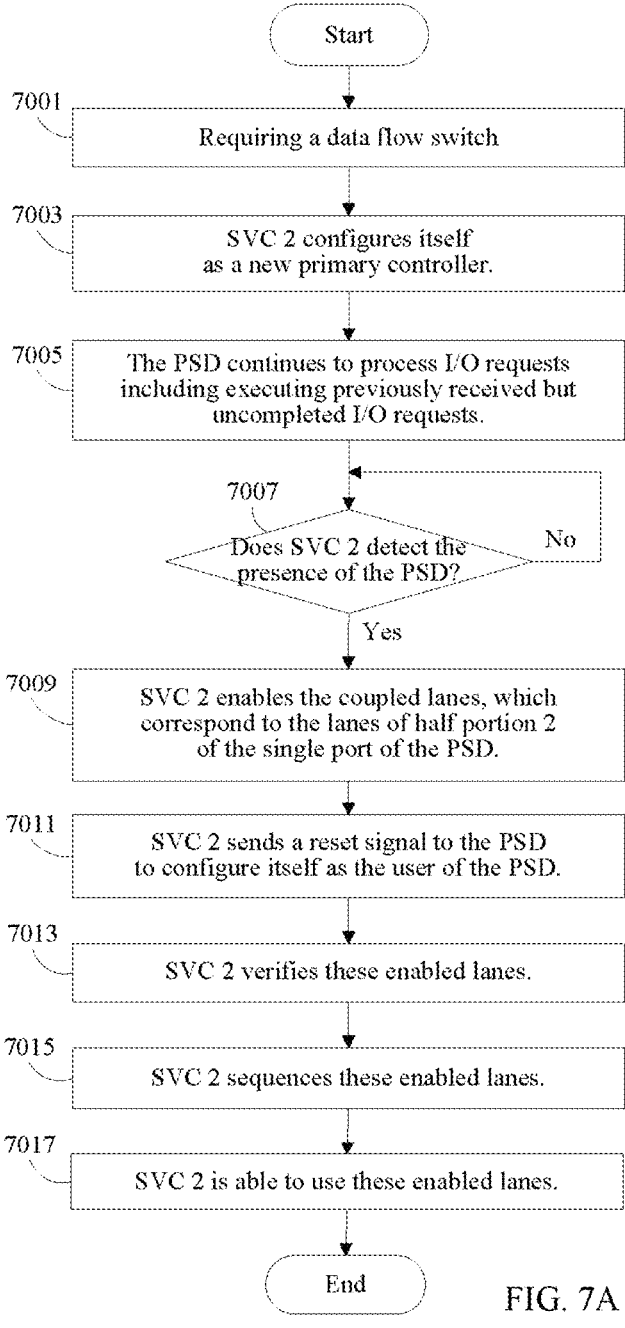
FIG. 7A is a flowchart regarding the process of switching the user of the PSDs to a new primary controller when the original primary controller malfunctions according to one embodiment of the present invention.
Figure 7B:
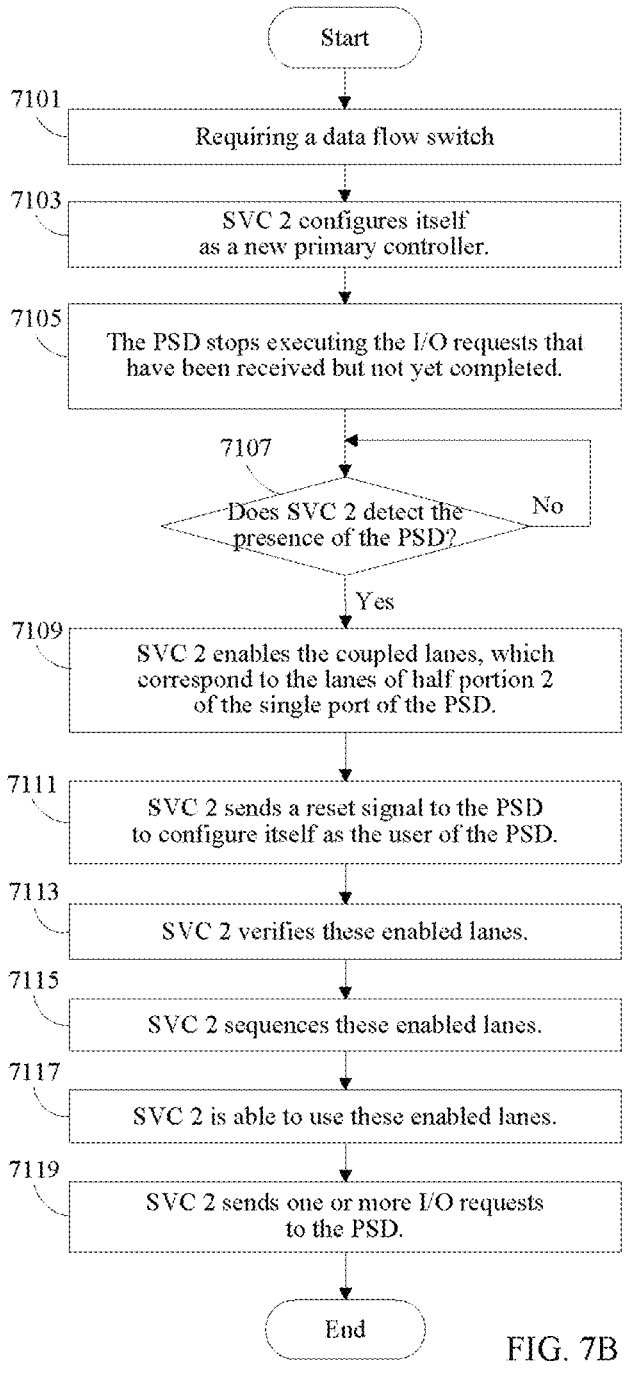
FIG. 7B is another flowchart regarding the process of switching the user of the PSDs to a new primary controller when the original primary controller malfunctions according to another embodiment of the present invention.

Please refer to FIGS. 7A and 7B below. FIGS. 7A and 7B are flowcharts, according to different embodiments of the present invention, illustrating the process of switching the user of the PSDs (9) to a new primary controller when a data flow switch is required. According to one embodiment of the invention, the need for a data flow switch may arise because the primary controller is not functioning properly. In another embodiment of the present invention, a data flow switch may also be necessary even when both controllers are functioning properly, due to a change in the user of the PSD (9). The following explanation of the flowcharts in FIGS. 7A and 7B is based on the example where "the primary controller is not functioning properly".

A monitoring mechanism is established through communication between the primary controller and the secondary controller via the redundant controller communicating (RCC) interconnect (7), enabling the secondary controller to monitor the operational status of the primary controller. According to one embodiment of the present invention, the monitoring mechanism may function as follows: the primary controller sends a confirmation signal to the secondary controller at each first time interval of ΔT1, allowing the secondary controller to be aware that the primary controller is still functioning properly. This means that if the secondary controller, after receiving an acknowledgment signal, does not receive another one from the primary controller within a period exceeding the first time interval of ΔT1, the secondary controller will determine that the primary controller is not operating properly and then will begin preparing to take over the responsibilities of the primary controller.

According to another embodiment of the present invention, the monitoring mechanism may function as follows: the secondary controller sends a query signal to the primary controller at each second time interval of ΔT2 and waits for a response signal from the primary controller. If the secondary controller receives a response signal from the primary controller, the secondary controller will determine that the primary controller is still functioning properly. During system operation, the secondary controller continuously repeats the aforesaid process to determine the operational status of the primary controller. Conversely, if the secondary controller does not receive a response signal from the primary controller, the secondary controller will determine that the primary controller is not operating properly and then will begin preparing to take over the responsibilities of the primary controller.

Please refer to FIG. 7A again. The following description applies to the RAID subsystems (4D, 4E) of the storage system architectures (2D, 2E) shown in FIG. 2A, FIG. 2B, and FIG. 3, wherein the first SVC (SVC 1) (10) is configured as the primary controller of one or more PSDs (9) (e.g., PSD 1 (9a)), while the second SVC (SVC 2) (20) is configured as the secondary controller of the same one or more PSDs (9) (e.g., PSD 1 (9a)). According to one embodiment of the present invention, when a data flow switch is required (step 7001), for example, if the second SVC (SVC 2) (20) determines, based on the aforementioned monitoring mechanism, that the first SVC (SVC 1) (10) is not functioning properly, or if it is necessary to switch the user of the PSD (e.g., PSD 1 (9a) to the second SVC (SVC 2) (20) even when the first SVC (SVC 1) (10) is still operating normally, the second SVC (SVC 2) (20) will configure itself as the new primary controller (step 7003). During the switching process, although the original primary controller (i.e., SVC 1 (10)) suspends its services, the PSD (9) (e.g., PSD 1 (9a)) still continues to receive its dedicated clock signal without interruption, as the clock signal of the PSD (9) (e.g., PSD 1 (9a)) is provided by its own dedicated clock generation circuit (85) (e.g., clock generation circuit 1 (85a). As a result, the PSD (9) can still process I/O requests based on the dedicated clock signal, including continuing to execute previously received but uncompleted I/O requests (step 7005). After taking over the tasks of the first SVC (SVC 1) (10), the second SVC (SVC 2) (20), now serving as the new primary controller, detects the presence of the PSD (9) (e.g., PSD 1 (9a)) via the second switch (switch 2) (209) (step 7007).

Next, the second SVC (SVC 2) (20) (i.e., the new primary controller) enables the coupled lanes through the second switch (switch 2) (209). These enabled lanes correspond to the lanes of the second half (half portion 2) (902) of the single port of the PSD (9) (e.g., PSD 1 (9a)), which are coupled to it (step 7009). Subsequently, the second SVC (SVC 2) (20) (i.e., the new primary controller) sends a reset signal to the PSD (9) (e.g., PSD 1 (9a)) through the second switch (switch 2) (209) to ask the PSD (9) to configure itself as the user of the PSD (9) (step 7011). Once the PSD (9) (e.g., PSD 1 (9a)) has successfully been configured to set the second SVC (SVC 2) (20) as its user, the second SVC (SVC 2) (20) verifies, through the second switch (switch 2) (209), the enabled lanes corresponding to the lanes of the second half (half portion 2) (902) of the single port of the PSD (9) (step 7013).

Afterward, the second SVC (SVC 2) (20) sequences the enabled lanes corresponding to the lanes in the second half (half portion 2) (902) of the single port of the PSD (9) through the second switch (switch 2) (209). The sequencing method starts with the first lane among the PCIe lanes in the second half (half portion 2) (902) of the single port to which it is coupled, and proceeds sequentially (step 7015). For example, assume that the single port of the PSD (9) (e.g., PSD 1 (9a)) has a single port with four PCIe lanes. The second SVC (SVC 2) (20), which has become the new primary controller, sequentially configures, through the second switch (switch 2) (209), the setting values of each of these enabled lanes (corresponding to the lanes in the second half (half portion 2) (902) of the single port that is coupled to it). According to the embodiment illustrated in FIG. 2D, the new primary controller (i.e., SVC 2 (20)) sequentially configures the setting values of these enabled lanes (corresponding to the lanes in the second half (half portion 2) (902) of the single port) through the switch (i.e., switch 2 (209). In this way, the two lanes in the second half (half portion 2) (902) of the single port are respectively mapped as lane "0" and lane "1", and the four PCIe lanes of the single port, including the two lanes in the first half (half portion 1) (901) and the two lanes in the second half (half portion 2) (902) are sequentially mapped as lane "3", lane "2", lane "1", and lane "0". This lane numbering is exactly the reverse of the lane numbering previously used by the original primary controller (i.e., SVC 1 (10)).

Finally, the second SVC (SVC 2) (20) utilizes these enabled lanes through the second switch (switch 2) (209). These enabled lanes correspond to the lanes in the second half (half portion 2) (902) of the single port of the PSD (9) (e.g., PSD 1 (9a)), which are coupled to it. That is to say, after the aforesaid sequencing, these enabled lanes correspond to lane "0" and lane "1" of the second half (half portion 2) (902) (step 7017). In this way, a signal connection is established between the new primary controller (i.e., SVC 2 (20)) and the PSD (9) (e.g., PSD 1 (9a)). And now, the process of configuring the PSD (9) to use the second SVC (SVC 2) (20) as its user is completed. Afterward, when the second SVC (SVC 2) (20) sends a second I/O request to the PSD (9) (e.g., PSD 1 (9a)), the PSD (9) (e.g., PSD 1 (9a)) receives the second I/O request via the lanes of the second half (half portion 2) (902) of the single port, and processes the second I/O request based on the dedicated clock signal provided by its dedicated clock generation circuit (85) (e.g., clock generation circuit 1 (85a)).

The following example illustrates this process, using the RAID subsystem (4D) of the storage system architecture (2D) shown in FIG. 2A. It is assumed that the first SVC (SVC 1) (10) acts as the primary controller of the PSD (9) (e.g., PSD 1 (9a)), while the second SVC (SVC 2) (20) serves as the secondary controller of the PSD (9) (e.g., the first single-port PSD (PSD 1) (9a)). At time point T1, the first SVC (SVC 1) (10) sends a first I/O request to the first PSD (PSD 1) (9a) through its first device-side I/O device interconnect controller (device-side I/O device interconnect controller 1) (107), requesting to read data (READ data) from the first PSD (PSD 1) (9*a*). At time point T2, after receiving the first I/O request, the first PSD (PSD 1) (9*a*) prepares the required READ data for the first SVC (SVC 1) (10). At later time point T3, due to the first SVC (SVC 1) (10) becoming unable to operate normally or for other reasons, a data flow switch is required, and the second SVC (SVC 2) must take over the service (20) (step 7001). At time point T4, the second SVC (SVC 2) (20) takes over the responsibilities of the first SVC (SVC 1) (10) and becomes the new primary controller (step 7003). At time point T5, the second SVC (SVC 2) (20) detects the presence of the first PSD (PSD 1) (9*a*) through the second switch (switch 2) (209) (step 7007). The second SVC (SVC 2) (20) then enables the coupled lanes through the second switch (switch 2) (209). These enabled lanes correspond to the lanes in the second half (half portion 2) (902) of the single port of the PSD (9) (e.g., PSD 1 (9*a*)), which are coupled to the second SVC (SVC 2) (20) (step 7009). Afterward, the second SVC (SVC 2) (20) (i.e., the new primary controller) sends a reset signal to the PSD (9) (e.g., PSD 1 (9*a*)) through the second switch (switch 2) (209) to request the PSD (9) to configure it as the device's user (step 7011). At time point T6, once the user of the first PSD (PSD 1) (9*a*) has been successfully configured as the second SVC (SVC 2) (20), the second SVC (SVC 2) (20) then verifies the enabled lanes (corresponding to the lanes in the second half (half portion 2) (902) of the single port of the first PSD (PSD 1) (9*a*)) through the second switch (switch 2) (209) (step 7013). Subsequently, at time point T7, the second SVC (SVC 2) (20) sequences the enabled lanes (corresponding to the lanes in the second half (half portion 2) (902) of the single port of the first PSD (PSD 1) (9*a*)) through the second switch (switch 2) (209) (step 7015). Next, at time point T8, the second SVC (SVC 2) (20) utilizes the sequenced enabled lanes (corresponding to the lanes in the second half (half portion 2) (902) of the single port of the first PSD (PSD 1) (9*a*) which are coupled to the second SVC (SVC 2)) through the switch 2 (209) (20) (step 7017). In this embodiment, although the services provided by the primary controller are interrupted during the process of data flow switching, the first PSD (PSD 1) (9*a*) still continues performing the ongoing I/O request (step 7005). Finally, the prepared READ data is sent to the new primary controller (i.e., SVC 2 (20)), thus completing the I/O request operation.

Please refer to FIG. 7B again. The following descriptions apply to the RAID subsystems (4D, 4E) of the storage system architectures (2D, 2E) illustrated in FIG. 2A, FIG. 2B, and FIG. 3, where the first SVC (SVC 1) (10) is configured as the primary controller of one or more PSDs (9) (e.g., PSD 1 (9*a*)), while the second SVC (SVC 2) (20) is configured as the secondary controller of the same one or more PSDs (9) (e.g., PSD 1 (9*a*)). According to one embodiment of the present invention, when a data flow switch is required (step 7101)—for example, if the second SVC (SVC 2) (20) determines, based on the aforementioned monitoring mechanism, that the first SVC (SVC 1) (10) is not functioning normally, or if it is necessary to switch the user of the PSD (e.g., PSD 1 (9*a*) to the second SVC (SVC 2) (20) even when the first SVC (SVC 1) (10) is still operating normally the second SVC (SVC 2) (20) will configure itself as the new primary controller (step 7103). At this point, according to another embodiment of the present invention, the RAID subsystems (4D, 4E) may optionally instruct the PSD (9) (e.g., PSD 1 (9*a*)) to temporarily pause or stop executing I/O requests that have been received but not yet completed (step 7105).

Then, after taking over the responsibilities of the first SVC (SVC 1) (10), the second SVC (SVC 2) (20) (i.e., the new primary controller) detects the presence of the PSD (9) (e.g., the first single-port PSD (PSD 1) (9*a*)) through the switch 2 (209) (step 7107). Next, the second SVC (SVC 2) (20) (i.e., the new primary controller) enables the coupled lanes through the second switch (switch 2) (209). These enabled lanes correspond to the lanes of the second half (half portion 2) (902) of the single port of the PSD (9) (e.g., PSD 1 (9*a*)), which are coupled to the second SVC (SVC 2) (20) (step 7109). Subsequently, the second SVC (SVC 2) (20) (i.e., the new primary controller) sends a reset signal through the second switch (switch 2) (209) to the PSD (9) (e.g., PSD 1 (9*a*)) to ask the PSD (9) to configure the second SVC (SVC 2) (20) as the user of the PSD (9) (step 7111).

Once the PSD (9) (e.g., PSD 1 (9*a*)) has successfully been configured to set the second SVC (SVC 2) (20) as its user, the second SVC (SVC 2) (20) verifies, through the second switch (switch 2) (209), the enabled lanes (corresponding to the lanes of the second half (half portion 2) (902) of the single port of the PSD (9)) (step 7113). Afterward, the second SVC (SVC 2) (20) sequences the enabled lanes (corresponding to the lanes in the second half (half portion 2) (902) of the single port of the PSD (9)) through the second switch (switch 2) (209). The sequencing method starts with the first lane among the PCIe lanes in the second half (half portion 2) (902) of the single port to which it is coupled, and proceeds sequentially (step 7115). For example, assume that the single port of the PSD (9) (e.g., PSD 1 (9*a*)) has a single port with four PCIe lanes. The second SVC (SVC 2) (20), which has become the new primary controller, sequentially configures the setting values of each of the enabled lanes (corresponding to the lanes in the second half (half portion 2) (902) of the single port, which is coupled to it) through the second switch (switch 2) (209). According to the embodiment shown in FIG. 2D, the new primary controller (i.e., SVC 2 (20)) sequentially configures the setting values of these enabled lanes (corresponding to the lanes in the second half (half portion 2) (902) of the single port) through the switch (i.e., switch 2 (209). In this way, the two lanes in the second half (half portions 2) (902) of the single port are respectively mapped as lane "0" and lane "1", and the four PCIe lanes of the single port, including the two lanes in the first half (half portion 1) (901) and the two lanes in the second half (half portion 2) (902) are sequentially mapped as lane "3", lane "2", lane "1", and lane "0". This lane numbering is exactly the reverse of the lane numbering previously used by the original primary controller (i.e., SVC 1 (10)).

Subsequently, the second SVC (SVC 2) (20) utilizes the enabled lanes through the second switch (switch 2) (209). These enabled lanes correspond to the lanes in the second half (half portion 2) (902) of the single port of the PSD (9) (e.g., PSD 1 (9*a*)), which are coupled to it; that is, after the aforesaid sequencing, these enabled lanes correspond to the lanes "0" and lane "1" of the second half (half portion 2) (902) (step 7117). Afterward, the PSD (9) (e.g., PSD 1 (9*a*)) receives a second I/O request from the second SVC (SVC 2) (20) via the lanes of the second half (half portion 2) (902) of the single port, and processes the second I/O request according to the dedicated clock signal provided by its dedicated clock generation circuit (85) (step 7119).

The following example illustrates this process, where the RAID subsystem (4D) of the storage system architecture (2D) in FIG. 2A is used for explanation, and it is assumed that the first SVC (SVC 1) (10) serves as the primary controller of the PSD (9) (e.g., PSD 1 (9*a*)), while the second SVC (SVC 2) (20) serves as the secondary controller of the PSD (9) (e.g., the first single-port PSD (PSD 1) (9a)). At time point T1, the first SVC (SVC 1) (10) sends a second I/O request to the first PSD (PSD 1) (9a) through its first device-side I/O device interconnect controller (device-side I/O device interconnect controller 1) (107), requesting to read data (READ data) from the first PSD (PSD 1) (9a). At time point T2, after receiving the second I/O request, the first PSD (PSD 1) (9a) prepares the required READ data for the first SVC (SVC 1) (10). At later subsequent time point T3, due to the first SVC (SVC 1) (10) becoming unable to operate normally or for other reasons, a data flow switch is required, and the second SVC (SVC 2) (20) must take over the service (step 7101). At time point T4, the second SVC (SVC 2) (20) takes over the responsibilities of the first SVC (SVC 1) (10) and becomes the new primary controller (step 7103). Subsequently, the first PSD (PSD 1) (9a) stops the execution of incomplete I/O requests previously issued by the failed controller (i.e., SVC 1 (10)) (step 7105). At time point T5, the second SVC (SVC 2) (20) detects the presence of the first PSD (PSD 1) (9a) through the second switch (switch 2) (209) (step 7107). Then, the second SVC (SVC 2) (20) enables the coupled lanes through the second switch (switch 2) (209). These enabled lanes correspond to the lanes in the second half (half portion 2) (902) of the single port of the PSD (9) (e.g., PSD 1 (9a)), which are coupled to the second SVC (SVC 2) (20) (step 7109). Afterward, the second SVC (SVC 2) (20) (i.e., the new primary controller) sends a reset signal to the PSD (9) (e.g., PSD 1 (9a)) through the second switch (switch 2) (209) to request the PSD (9) to configure the second SVC (SVC 2) (20) as the device's user (step 7111). At time point T6, once the user of the first PSD (PSD 1) (9a) has been successfully configured as the second SVC (SVC 2) (20), the second SVC (SVC 2) (20) verifies the enabled lanes (corresponding to the lanes in the second half (half portion 2) (902) of the single port of the first PSD (PSD 1) (9a)) through the second switch (switch 2) (209) (step 7113). Next, at time point T7, the second SVC (SVC 2) (20) sequences these enabled lanes (corresponding to the lanes in the second half (half portion 2) (902) of the single port of the first PSD (PSD 1) (9a)) through the second switch (switch 2) (209) (step 7115). Then, at time point T8, after the aforesaid configuration, the second SVC (SVC 2) (20) utilizes these sequenced enabled lanes (corresponding to the lanes in the second half (half portion 2) (902) of the single port of the first PSD (PSD 1) (9a), which are coupled to the second SVC (SVC 2) (20)) through the second switch (switch 2) (209) (step 7117). Finally, at time point T9, the first PSD (PSD 1) (9a) receives a dedicated clock signal from its own dedicated clock generation circuit (dedicated clock generation circuit 1) (85a) and processes one or more second I/O requests from the new primary controller (i.e., SVC 2 (20)) based on the dedicated clock signal (step 7119). In this embodiment, when the first PSD (PSD 1) (9a) needs to switch the data flow to the new primary controller (i.e., SVC 2 (20)), the first PSD (PSD 1) (9a) stops or temporarily pauses the execution of any I/O requests previously issued by the first SVC (SVC 1) (10). Later, at time point T9, the second SVC (SVC 2) (20) issues new I/O requests to the first PSD (PSD 1) (9a), requesting to re-read the requested READ data from the first PSD (PSD 1) (9a) (step 7119).

According to one embodiment of the present invention, although the foregoing description assumes that in FIGS. 2A, 2B, 2C, 2D, and 3, the primary controller of the first PSD (PSD 1) (9a) is the first SVC (SVC 1) (10) and the secondary controller is the second SVC (SVC 2) (20), the primary and the secondary controllers of the second PSD (PSD 2) (9b) do not necessarily have to be configured the same way as those of the first PSD (PSD 1) (9a). The second PSD (PSD 2) (9b) may also be configured, as needed, with the second SVC (SVC 2) (20) serving as its primary controller and the first SVC (SVC 1) (10) serving as its secondary controller. Furthermore, the operational behavior of the first SVC (SVC 1) (10) and the second SVC (SVC 2) (20) with respect to other PSD (9) (e.g., PSD 2 (9b)) is substantially the same as that described for the two SVCs (SVC 1 (10) and SVC 2 (20)) with respect to the PSD (9) (e.g., PSD 1 (9a)) shown in FIG. 7A and FIG. 7B. Therefore, a further detailed explanation is omitted here.

In conclusion, according to the technology disclosed in the present invention, each of the PSDs (9) in the storage system architectures (2D, 2E) is equipped with an independently-operating and dedicated clock generation circuit (85) that provides a dedicated clock signal in a one-to-one manner (i.e., each of the PSDs (9) is paired with one dedicated clock generation circuit). Since the present invention employs the independently operating and dedicated clock generation circuits to deliver the dedicated clock signals to their associated PSDs (9) in a one-to-one manner, it not only eliminates the need to rely on the SVCs (10, 20) to provide clock signals but also eliminates the need for additional circuit components (such as the distributors (113, 115, 117)) to assist the SVCs (10, 20) in routing clock signals to multiple coupled PSDs (9).

Thus, the present invention not only resolves the issue in prior art where a PSD (9) coupled to a failed SVC cannot operate properly due to the absence of clock signals, but also resolves the issue in prior art where the failure of a distributor prevents clock signals from being delivered to multiple coupled PSDs (9), resulting in operational failures. Additionally, by eliminating the need for extra circuit components (e.g., distributors 113, 115, 117), the present invention not only reduces costs and simplifies routing, but also mitigates the risk of system vulnerabilities that could compromise redundancy due to distributor failures.

While the preferred embodiments of the present invention have been disclosed as described above, it is not intended to limit the scope of the invention. Those skilled in the art may make minor modifications and variations without departing from the spirit of the present invention, and such modifications and variations are still within the scope of the present invention. Therefore, the scope of the present invention shall be determined by the claims attached to this specification, and not limited to the specific embodiments disclosed herein.

The above description is merely a preferred embodiment of the present invention. Any equivalent variations or modifications made according to the scope of the claims of this invention should fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data access method applied to a RAID subsystem (4D, 4E), wherein the RAID subsystem (4D, 4E) comprises a first storage virtualization controller (SVC 1) (10), a second storage virtualization controller (SVC 2) (20), a first switch (switch 1) (109), a second switch (switch 2) (209), a first physical storage device (PSD 1) (9, 9a), a backplane (401), and a first clock generation circuit (clock generation circuit 1) (85, 85a), the method comprising:

installing the first clock generation circuit (clock generation circuit 1) (85, 85a) on the backplane (401), the first clock generation circuit (clock generation circuit 1) (85, 85a) being configured to provide a first dedicated clock signal to the first physical storage device (PSD 1) (9, 9a);

coupling a first half (half portion 1) (901) of a single port of the first physical storage device (PSD 1) (9, 9a) to the first storage virtualization controller (SVC 1) (10) via the first switch (switch 1) (109);

coupling a second half (half portion 2) (902) of the single port of the first physical storage device (PSD 1) (9, 9a) to the second storage virtualization controller (SVC 2) (20) via the second switch (switch 2) (209);

configuring the first storage virtualization controller (SVC 1) (10) as a user of the first physical storage device (PSD 1) (9, 9a);

receiving, by the first physical storage device (PSD 1) (9, 9a), at least one first input/output (I/O) request from the first storage virtualization controller (SVC 1) (10) and processing the at least one first I/O request based on the first dedicated clock signal provided by the first clock generation circuit (clock generation circuit 1) (85, 85a);

configuring the second storage virtualization controller (SVC 2) (20) as the user of the first physical storage device (PSD 1) (9, 9a); and receiving, by the first physical storage device (PSD 1) (9, 9a), at least one second I/O request from the second storage virtualization controller (SVC 2) (20) via the second half (half portion 2) (902) of the single port and processing the at least one second I/O request based on the first dedicated clock signal provided by the first clock generation circuit (clock generation circuit 1) (85, 85a).

2. The data access method of claim 1, wherein the step of configuring the first storage virtualization controller (SVC 1) (10) as a user of the first physical storage device (PSD 1) (9, 9a) further comprises:

enabling, by the first storage virtualization controller (SVC 1) (10), at least one first lane coupled to the first physical storage device (PSD 1) (9, 9a), wherein the at least one first lane corresponds to a lane of the first half (half portion 1) (901) of the single port of the first physical storage device (PSD 1) (9, 9a);

sending, by the first storage virtualization controller (SVC 1) (10), a first reset signal to the first physical storage device (PSD 1) (9, 9a) to request the first physical storage device (PSD 1) (9, 9a) to configure the first storage virtualization controller (SVC 1) (10) as its user;

verifying, by the first storage virtualization controller (SVC 1) (10), the at least one first lane;

sequencing, by the first storage virtualization controller (SVC 1) (10), the at least one first lane; and utilizing, by the first storage virtualization controller (SVC 1) (10), the at least one first lane.

3. The data access method of claim 2, wherein the step of configuring the first storage virtualization controller (SVC 1) (10) as a user of the first physical storage device (PSD 1) (9, 9a) further comprises:

determining mutually, by the first storage virtualization controller (SVC 1) (10) and the second storage virtualization controller (SVC 2) (20), via a redundant controller communicating interconnect (7), that the first storage virtualization controller (SVC 1) (10) is a primary controller of the first physical storage device (PSD 1) (9, 9a).

4. The data access method of claim 3, wherein the redundant controller communicating interconnect (7) is selected from one of the following communication interconnect combinations, comprising: Peripheral Component Interconnect Express (PCI Express, PCI-E), Ethernet, Remote Direct Memory Access (RDMA), Fiber Channel-Arbitrated Loop (FC-AL), parallel Small Computer System Interface (parallel SCSI) operating in a target mode, and Serial Advanced Technology Attachment (SATA) operating in a target mode.

5. The data access method of claim 1, wherein the step of configuring the second storage virtualization controller (SVC 2) (20) as a user of the first physical storage device (PSD 1) (9, 9a) further comprises:

enabling, by the second storage virtualization controller (SVC 2) (20), at least one second lane coupled to the first physical storage device (PSD 1) (9, 9a), wherein the at least one second lane corresponds to a lane of the second half (half portion 2) (902) of the single port of the first physical storage device (PSD 1) (9, 9a);

sending, by the second storage virtualization controller (SVC 2) (20), a second reset signal to the first physical storage device (PSD 1) (9, 9a) for requesting the first physical storage device (PSD 1) (9, 9a) to set the second storage virtualization controller (SVC 2) (20) as its user;

verifying, by the second storage virtualization controller (SVC 2) (20), the at least one second lane;

sequencing, by the second storage virtualization controller (SVC 2) (20), the at least one second lane; and utilizing, by the second storage virtualization controller (SVC 2) (20), the at least one second lane.

6. The data access method of claim 1, wherein the first clock generation circuit (clock generation circuit 1) (85, 85a) provides the first dedicated clock signal to the first physical storage device (PSD 1) (9, 9a) in a one-to-one manner.

7. The data access method of claim 1, wherein the first storage virtualization controller (SVC 1) (10) and the second storage virtualization controller (SVC 2) (20) do not require additional circuit components to assist in routing their clock signals to the first physical storage device (PSD 1) (9, 9a).

8. The data access method of claim 1, further comprising that the second storage virtualization controller (SVC 2) (20) determines, through a monitoring mechanism, that the first storage virtualization controller (SVC 2) (10) is not functioning properly.

9. The data access method of claim 8, wherein the monitoring mechanism comprises a step of sending, by the first storage virtualization controller (SVC 1) (10), a confirmation signal to the second storage virtualization controller (SVC2) (20) at each first time interval.

10. The data access method of claim 8, wherein the monitoring mechanism comprises a step of sending, by the second storage virtualization controller (SVC 2) (20), a query signal to the first storage virtualization controller (SVC 1) (10) at each second time interval and waiting for a response signal from the first storage virtualization controller (SVC 1) (10).

11. The data access method of claim 1, wherein the first clock generation circuit (clock generation circuit 1) (85, 85a) is a component directly mounted on the backplane (401).

12. The data access method of claim 1, wherein the first clock generation circuit (clock generation circuit 1) (85, 85a) is coupled to a first socket on the backplane (401).

13. The data access method of claim 12, wherein the first clock generation circuit (clock generation circuit 1) (85, 85a) is coupled to the first socket on the backplane (401) via a first interposer.

14. The data access method of claim 1, wherein the first storage virtualization controller (SVC 1) (10), the second storage virtualization controller (SVC 2) (20), the first switch (switch 1) (109), and the second switch (switch 2) (209) are separate and independent circuitries, respectively.

15. The data access method of claim 1, wherein the first switch (switch 1) (109) and the second switch (switch 2) (209) are respectively integrated into the first storage virtualization controller (SVC 1) (10) and the second storage virtualization controller (SVC 2) (20).

16. The data access method of claim 1, wherein the first switch (switch 1) (109) and the second switch (switch 2) (209) are integrated into a single switch, through which the first storage virtualization controller (SVC 1) (10) and the second storage virtualization controller (SVC2) (20) are respectively coupled to the first physical storage device (PSD 1) (9, 9a).

17. The data access method of claim 1, wherein, during a process of switching the user of the first physical storage device (PSD 1) (9, 9a) from the first storage virtualization controller (SVC 1) (10) to the second storage virtualization controller (SVC 2) (20), the first physical storage device (PSD 1) (9, 9a) continues to process the at least one first I/O request issued by the first storage virtualization controller (SVC 1) (10) based on the first dedicated clock signal provided by the first clock generation circuit (clock generation circuit 1) (85, 85a).

18. The data access method of claim 1, wherein, during a process of switching the user of the first physical storage device (PSD 1) (9, 9a) from the first storage virtualization controller (SVC 1) (10) to the second storage virtualization controller (SVC 2) (20), the first physical storage device (PSD 1) (9, 9a) stops executing the at least one first I/O request issued by the first storage virtualization controller (SVC 1) (10).

19. The data access method of claim 1, wherein the RAID subsystem (4D, 4E) further comprises a second physical storage device (PSD 2) (9, 9b) and a second clock generation circuit (clock generation circuit 2) (85, 85b), the method further comprising:

installing the second clock generation circuit (clock generation circuit 2) (85, 85b) on the backplane (401), the second clock generation circuit (clock generation circuit 2) (85, 85b) being configured to provide a second dedicated clock signal to the second physical storage device (PSD 2) (9, 9b);

coupling a first half (half portion 1) (901) of a single port of the second physical storage device (PSD 2) (9, 9b) to the second storage virtualization controller (SVC 2) (20) via the second switch (switch 2) (209);

coupling a second half (half portion 2) (902) of the single port of the second physical storage device (PSD 2) (9, 9b) to the first storage virtualization controller (SVC 1) (10) via the first switch (switch 1) (109);

configuring the second storage virtualization controller (SVC 2) (20) as a user of the second physical storage device (PSD 2) (9, 9b);

receiving, by the second physical storage device (PSD 2) (9, 9b), at least one second I/O request from the second storage virtualization controller (SVC 2) (20) via the first half (half portion 1) (901) of the single port, and processing the at least one second I/O request based on the second dedicated clock signal provided by the second clock generation circuit (clock generation circuit 2) (85, 85b);

sending, by the first storage virtualization controller (SVC 1) (10), a reset signal to the first switch (switch 1) (109), thereby configuring the user of the second physical storage device (PSD 2) (9, 9b) as the first storage virtualization controller (SVC 1) (10); and processing, by the second physical storage device (PSD 2) (9, 9b), at least one third I/O request issued by the first storage virtualization controller (SVC 1) (10) via lanes of the second half (half portion 2) (902), based on the second dedicated clock signal provided by the second clock generation circuit (clock generation circuit 2) (85, 85b).

20. The data access method of claim 19, wherein the second clock generation circuit (clock generation circuit 2) (85, 85b) provides the second dedicated clock signal to the second physical storage device (PSD 2) (9, 9b) in a one-to-one manner.

21. A RAID (redundant array of independent disks) subsystem (4D, 4E), which is coupled to a host (15) and is configured to receive and process at least one access request from the host (15), the RAID subsystem (4D, 4E) comprising:

a first storage virtualization controller (SVC 1) (10) comprising a first switch (switch 1) (109);

a second storage virtualization controller (SVC 2) (20) comprising a second switch (switch 2) (209) and communicating with the first storage virtualization controller (SVC 1) (10) via a redundant controller communicating interconnect (7);

a first physical storage device (PSD 1) (9, 9a) comprising a single port, wherein lanes of the single port are divided into a first half (half portion 1) (901) and a second half (half portion 2) (902), wherein the first half (half portion 1) (901) is coupled to the first switch (switch 1) (109) of the first storage virtualization controller (SVC 1) (10), and the second half (half portion 2) (902) is coupled to the second switch (switch 2) (209) of the second storage virtualization controller (SVC 2) (20); and a first clock generation circuit (clock generation circuit 1) (85, 85a) being coupled to the first physical storage device (PSD 1) (9, 9a) for providing a first dedicated clock signal to the first physical storage device (PSD 1) (9, 9a);

wherein when the first storage virtualization controller (SVC 1) (10) and the second storage virtualization controller (SVC 2) (20) determine, via the redundant controller communicating interconnect (7), that the first storage virtualization controller (SVC 1) (10) is a user of the first physical storage device (PSD 1) (9, 9a), the first storage virtualization controller (SVC 1) (10) configures itself as the user of the first physical storage device (PSD 1) (9, 9a) and sends at least one first input/output (I/O) request to the first physical storage device (PSD 1) (9, 9a) through the first switch (switch 1) (109), wherein the first physical storage device (PSD 1) (9, 9a) processes the at least one first I/O request based on the first dedicated clock signal provided by the first clock generation circuit (clock generation circuit 1) (85, 85a); and wherein when the user of the first physical storage device (PSD 1) (9, 9a) switches to the second storage virtualization controller (SVC 2) (20), the second storage virtualization controller (SVC 2) (20) configures itself as the user of the first physical storage device (PSD 1) (9, 9a) and sends at least one second input/output (I/O) request to the first physical storage device (PSD 1) (9, 9a) through the second switch (switch 2) (209), wherein the first physical storage device (PSD 1) (9, 9a) processes the at least one second I/O request based on the first dedicated clock signal provided by the first clock generation circuit (clock generation circuit 1) (85, 85a).

22. The RAID subsystem (4D, 4E) of claim 21, wherein the first storage virtualization controller (SVC 1) (10) further comprises:

a first central processing circuitry (CPC 1) (103) for processing the at least one access request from the host (15); and a first device-side input/output (I/O) device interconnect controller (device-side I/O device interconnect controller 1) (107) for receiving messages and commands from the first central processing circuitry (CPC 1) (103), and being coupled to the first physical storage device (PSD 1) (9, 9a) via the first switch (switch 1) (109) to serve as an interface and a buffer between the first physical storage device (PSD 1) (9, 9a) and the first central processing circuit (CPC 1) (103).

23. The RAID subsystem (4D, 4E) of claim 22, wherein the first switch (switch 1) (109) is integrated into the first device-side I/O device interconnect controller (device-side I/O device interconnect controller 1) (107).

24. The RAID subsystem (4D, 4E) of claim 22, wherein the first switch (switch 1) (109) and the first device-side I/O device interconnect controller (device-side I/O device interconnect controller 1) (107) are integrated into the first central processing circuitry (CPC 1) (103).

25. The RAID subsystem (4D, 4E) of claim 21, wherein the second storage virtualization controller (SVC 2) (20) further comprises:

a second central processing circuitry (CPC 2) (203) for processing the at least one access request from the host (15); and a second device-side input/output (I/O) device interconnect controller (device-side I/O device interconnect controller 2) (207) for receiving messages and commands from the second central processing circuitry (CPC 2) (203), and being coupled to the first physical storage device (PSD 1) (9, 9a) via the second switch (switch 2) (209) to serve as an interface and a buffer between the first physical storage device (PSD 1) (9, 9a) and the second central processing circuitry (CPC 2) (203).

26. The RAID subsystem (4D, 4E) of claim 25, wherein the second switch (switch 2) (209) is integrated into the second device-side I/O device interconnect controller (device-side I/O device interconnect controller 2) (207).

27. The RAID subsystem (4D, 4E) of claim 25, wherein the second switch (switch 2) (209) and the second device-side I/O device interconnect controller (device-side I/O device interconnect controller 2) (207) are integrated into the second central processing circuitry (CPC 2) (203).

28. The RAID subsystem (4D, 4E) of claim 21, wherein the redundant controller communicating interconnect (7) is selected from one of the following communication interconnect combinations, comprising: Peripheral Component Interconnect Express (PCI Express, PCI-E), Ethernet, Remote Direct Memory Access (RDMA), Fiber Channel-Arbitrated Loop (FC-AL), parallel Small Computer System Interface (parallel SCSI) operating in a target mode, and Serial Advanced Technology Attachment (SATA) operating in a target mode.

29. The RAID subsystem (4D, 4E) of claim 21, wherein the first clock generation circuit (clock generation circuit 1) (85, 85a) provides the first dedicated clock signal to the first physical storage device (PSD 1) (9, 9a) in a one-to-one manner.

30. The RAID subsystem (4D, 4E) of claim 21, wherein the first storage virtualization controller (SVC 1) (10) and the second storage virtualization controller (SVC 2) (20) do not require additional circuit components to assist in routing their clock signals to the first physical storage device (PSD 1) (9, 9a).

31. The RAID subsystem (4D, 4E) of claim 21, wherein the first storage virtualization controller (SVC 1) (10), the second storage virtualization controller (SVC 2) (20), the first switch (switch 1) (109), and the second switch (switch 2) (209) are separate and independent circuitries, respectively.

32. The RAID subsystem (4D, 4E) of claim 21, wherein the first switch (switch 1) (109) and the second switch (switch 2) (209) are respectively integrated into the first storage virtualization controller (SVC 1) (10) and the second storage virtualization controller (SVC 2) (20).

33. The RAID subsystem (4D, 4E) of claim 21, wherein the first switch (switch 1) (109) and the second switch (switch 2) (209) are integrated into a single switch, through which the first storage virtualization controller (SVC 1) (10) and the second storage virtualization controller (SVC2) (20) are respectively coupled to the first physical storage device (PSD 1) (9, 9a).

34. The RAID subsystem (4D, 4E) of claim 21, further comprising a backplane (401), wherein the first clock generation circuit (clock generation circuit 1) (85, 85a) is directly mounted on the backplane (401) and coupled to the first physical storage device (PSD 1) (9, 9a) via the backplane (401).

35. The RAID subsystem (4D, 4E) of claim 21, further comprising a backplane (401), wherein the first clock generation circuit (clock generation circuit 1) (85, 85a) is coupled to a first socket on the backplane (401) and coupled to the first physical storage device (PSD 1) (9, 9a) via the backplane (401).

36. The RAID subsystem (4D, 4E) of claim 35, wherein the first clock generation circuit (clock generation circuit 1) (85, 85a) is coupled to the first socket on the backplane (401) via a first interposer.

37. The RAID subsystem (4D, 4E) of claim 21, further comprising a first interposer, the first interposer comprising the first clock generation circuit (clock generation circuit 1) (85, 85a) and a slot, the slot being configured to accommodate the first physical storage device (PSD 1) (9, 9a), thereby enabling the first physical storage device (PSD 1) (9, 9a) to be coupled to the first storage virtualization controller (SVC 1) (10) and the second storage virtualization controller (SVC 2) (20).

38. The RAID subsystem (4D, 4E) of claim 21, wherein, when the user of the first physical storage device (PSD 1) (9, 9a) is switched from the first storage virtualization controller (SVC 1) (10) to the second storage virtualization controller (SVC 2) (20), the first physical storage device (PSD 1) (9, 9a) continues to process the at least one first I/O request from the first storage virtualization controller (SVC 1) (10) based on the first dedicated clock signal provided by the first clock generation circuit (clock generation circuit 1) (85, 85a).

39. The RAID subsystem (4D, 4E) of claim 21, wherein, when the user of the first physical storage device (PSD 1) (9, 9a) is switched from the first storage virtualization controller (SVC 1) (10) to the second storage virtualization controller (SVC 2) (20), the first physical storage device (PSD 1) (9, 9a) stops executing the at least one first I/O request from the first storage virtualization controller (SVC 1) (10).

40. The RAID subsystem (4D, 4E) of claim 21, wherein the first storage virtualization controller (SVC 1) (10) configures itself as the user of the first physical storage device (PSD 1) (9, 9a) by performing the following steps: enabling at least one first lane coupled to the first physical storage device (PSD 1) (9, 9a); sending a first reset signal to the first physical storage device (PSD 1) (9, 9a) to request the first physical storage device (PSD 1) (9, 9a) to configure the first storage virtualization controller (SVC 1) (10) as its user; verifying the at least one first lane; sequencing the at least one first lane; and utilizing the at least one first lane, wherein the at least one first lane corresponds to a lane of the first half (half portion 1) (901) of the single port of the first physical storage device (PSD 1) (9, 9a).

41. The RAID subsystem (4D, 4E) of claim 21, wherein the second storage virtualization controller (SVC 2) (20) configures itself as the user of the first physical storage device (PSD 1) (9, 9a) by performing the following steps: enabling at least one second lane coupled to the first physical storage device (PSD 1) (9, 9a); sending a second reset signal to the first physical storage device (PSD 1) (9, 9a) to request the first physical storage device (PSD 1) (9, 9a) to configure the second storage virtualization controller (SVC 2) (20) as its user; verifying the at least one second lane; sequencing the at least one second lane; and utilizing the at least one second lane, wherein the at least one second lane corresponds to a lane of the second half (half portion 2) (902) of the single port of the first physical storage device (PSD 1) (9, 9a).

\* \* \* \* \*